PROCEDURE ENTRY FOR A DATA PROCESSOR EMPLOYING A STACK

Filed Oct. 2, 1967 12 Sheets--Sheet 1

INVENTORS.
ROBERT S. BARTON
BOBBY A. CREECH
BENJAMIN A. DENT
ERWIN A. HAUCK
WILLIAM M. McKEEMAN
BY Christie, Parker & Hale
ATTORNEYS.

```
2 BEGIN

   PROCEDURE A (DOIT); PROCEDURE DOIT;
 3 BEGIN
        REAL I,J;

        I ← 5;
        DOIT (I, J);
        IF J=25 THEN WRITE ("WORKED")
                ELSE WRITE ("FAILED");
   END;

   PROCEDURE B;
 3 BEGIN
        REAL K;
        PROCEDURE C (X, Y); REAL X, Y;
   4 BEGIN
          Y ← X ⊗ X;
          K ← 2;
     END;

        K ← 1;
        A (C);
        IF K=2 THEN WRITE ("WORKED")
               ELSE WRITE ("FAILED");
   END;

   B;
END
```

FIG. 5

| PROGRAM LEVEL: | CODE CONTAINED IN: | CAN REFERENCE: | BY THE ADDRESS COUPLE (LL,S) |
|---|---|---|---|
| 2 | OUTER BLOCK | A | 2,2 |
| | | B | 2,3 |
| 3 | PROCEDURE A | A | 2,2 |
| | | B | 2,3 |
| | | DOIT | 3,2 |
| | | I | 3,3 |
| | | J | 3,4 |
| 3 | PROCEDURE B | A | 2,2 |
| | | B | 2,3 |
| | | K | 3,2 |
| | | C | 3,3 |
| 4 | PROCEDURE C | A | 2,2 |
| | | B | 2,3 |
| | | K | 3,2 |
| | | C | 3,3 |
| | | X | 4,2 |
| | | Y | 4,3 |

PHASE II

United States Patent Office 3,548,384
Patented Dec. 15, 1970

3,548,384

PROCEDURE ENTRY FOR A DATA PROCESSOR EMPLOYING A STACK

Robert S. Barton, Salt Lake City, Utah, Bobby A. Creech, Glendora, Benjamin A. Dent, Altadena, Erwin A. Hauck, Arcadia, and William M. McKeeman, Palo Alto, Calif., assignors to Burroughs Corporation, Detroit, Mich., a corporation of Michigan

Filed Oct. 2, 1967, Ser. No. 672,042
Int. Cl. G06f *7/00*
U.S. Cl. 340—172.5 19 Claims

ABSTRACT OF THE DISCLOSURE

A data method and apparatus in a stored program processing system having a main memory for storing stacks of information for processing. The top two storage positions in the stack are two registers external to the memory. An additional memory has individually selectable display registers, each containing a different absolute memory address of a base of a stack area used to store parameters, variables and other reference words for a particular level of a program. Control words in the stacks contain information which create an ALGOL address environment list and a stack history list for the stacks. Other registers are provided in the system for storing various information used during the operation. Gating and timing is provided which causes the system to automatically update the display registers and therefore the address environment list in the stacks when the computer enters a new procedure which extends beyond the scope of the current ALGOL addressing environment as contained in the display registers. An address adder is provided to add parameters together to generate absolute addresses for addressing the memory.

CROSS REFERENCES TO RELATED APPLICATIONS

The present invention is directed to the method and apparatus by which the data processor employing a stack enters and exits a procedure. A copending patent application entitled Stack Mechanism Having Multiple Display Registers, filed in the names of the same inventors as the present application and assigned to the same assignee as the present application, bearing Ser. No. 672,688, filed Oct. 2, 1967, now U.S. Pat. 3,461,434 issued on Aug. 12, 1969 is directed to the implementation of the display registers disclosed herein. Another copending patent application entitled Data Processing System Having Tree Structured Stack Implementation filed on the same day as the present application in the names of the same inventors as the present application and assigned to the same assignee as the present application, bearing Ser. No. 672,226, filed Oct. 2, 1967, is directed to the means by which a number of different jobs can be executed utilizing common program codes and utilizing the display registers disclosed herein.

BACKGROUND OF THE INVENTION

This invention relates to data processing method and apparatus and more particularly to methods and apparatus in digital computers employing stack mechanisms.

The ALGOrithmic Language, commonly known as ALGOL, a language for expressing algorithms, was developed by an international group of computer people. ALGOL is defined in the May 1960 issue of the "Communications of the Association for Computing Machinery," in "Report on the ALGOrithmic Language ALGOL '60," edited by Peter Naur. One of the purposes of ALGOL is to give a set of rules by which procedures can be described in a form that can be accepted by a computer. However, programs expressed in ALGOL cannot be accepted directly by present computers and the ALGOL programs must be translated into machine language. Machine language is the actual code which causes each computer to carry out its own actual computing operations.

Programming aids and hardware aids have been employed in a prior art computer to minimize the translation between ALGOL programs and actual machine language codes. One such hardware aid is a stack mechanism in which information is placed on a last in, first out, basis.

The stack mechanism serves two basic functions. One is that it provides a means for the temporary storage of parameters, variables, and references to data and program segments and, a second is that it provides a means to store an indication of the history of a program.

A very important concept in a program written in ALGOL is that it is arranged into blocks. A block may contain sub-blocks. In the prior art computing machine employing a stack, the stacks contain storage areas for each ALGOL block. Each block storage area of a stack has a "Mark Stack Control Word" (MSCW). The MSCW is located at the beginning or base of each block storage area and serves to identify the particular block storage area. All parameters within the block storage area are referenced by addressing relative to the location of the corresponding MSCW.

A very important rule of ALGOL is in regard to "local and global" parameters and variables. The rule is that a parameter or variable may be referred to in an ALGOL block only if it is "local" or "global" to such block. A parameter or variable is "local" to a particular ALGOL block only if it is defined within such block. A parameter or variable is "global" to a particular block if such block is a sub-block to the block in which the parameter or variable is defined.

Two different lists have been proposed in the literature as a programming feature. One list is referred to as the stack history list, and the other the addressing environment list. The stack history list reflects to the actual sequential order in which a stack is built. The addressing environment list reflects the sequential ordering of the block storage areas according to the block structure rules of ALGOL. The stack history list and the address environment list are formed by information contained in the words which mark the beginning of each block storage area. In the embodiment of the invention disclosed herein these words are the MSCW's referred to hereinabove. FIG. 3 is a pictorial drawing illustrating how the MSCW's may display the stack history list and the address environment list for a particular stack. As indicated at the left side of FIG. 3, the local storage for blocks OUTER, B, A and C were formed in the stack in that order. MSCW's provide a stack history list so indicating (the arrows point in the reverse direction). In contrast, the MSCW's show that the ALGOL address environment list is quite different, as is indicated at the right side of FIG. 3. FIG. 2 is a tree structure diagram which illustrates the ALGOL address environment list in a different pictorial form. As indicated by the numbers positioned adjacent each of the circles shown in FIG. 2, the procedural blocks were called by the computer in the order OUTER, B, A and C (the same as that indicated in FIG. 3). The address environment list is such that block C is a sub-block of block B.

Thus, returning to the ALGOL concept of "local" and "global" variables for a moment, a variable or parameter defined in the OUTER block can be obtained and used in any of blocks A, B and C. Also, variables or parameters defined in block B can be obtained and used in block C.

However, a variable or parameter defined in block A cannot be obtained and used in block B or C.

The concept of the stack history list formed in the MSCW's has been implemented in the circuitry of a prior art computing machine. However, the concept of the address environment list has not. In the prior art machine incorporating the stack history concept, addressing within a stack is made relative to two registers. One register stores an address which points to the MSCW marking the beginning of the block storage area in which the computer is presently working (i.e. C). The other register is one which points to the MSCW of the outermost procedural block (i.e. OUTER). These registers are depicted at the right side of FIG. 2 as the F and R registers. The R register contains an absolute address of the MSCW for the OUTER block storage. The F register contains the absolute address of the MSCW for the current procedural block, namely the block storage C. Thus, to address a parameter within the OUTER block storage, addressing is done relative to the absolute address in the R register. To address a parameter within current block storage F, addressing is done relative to the absolute address in the F register.

However, this organization has given rise to an uplevel addressing problem. The uplevel addressing problem arises because the parameters and variables within all the intervening blocks (i.e. B), between the outermost block storage (i.e. OUTER) and the current block storage (i.e. C), are invisible to the current procedure and the computer and, therefore, these parameters and variables cannot be referenced in the current procedure. For example, with the computer currently working in block storage C, the parameters stored in block storage B could not be referenced because only parameters and variables stored in the current block storage C and the OUTER block storage could be referenced.

In contrast to the prior art, the parameters and variables and the intervening block storage areas are made visible in an embodiment of the present invention through a group of display registers. One display register is provided to point at the MSCW for each block storage area which it is permissible to reference. In other words, each display register contains the absolute address of a MSCW. Using the display registers, the local parameters of the intermediate procedures may now be addressed relative to the absolute addresses in the appropriate display registers. The display registers are depicted at the lefthand side of FIG. 2 and are referenced by the symbols D2, D3, etc.

Programming techniques have been devised which use program display registers in a similar manner. Such a programming system is described on pages 62 through 71 of the book entitled "ALGOL 60 Implementation" by Randell & Russell published in 1964 by the Academic Press. However, the programming concept requires a prohibitive amount of processor execution time and is not practicable. Accordingly, the embodiment of the present invention disclosed herein is a hardware implementation of this concept in a unique and novel manner.

SUMMARY OF THE INVENTION

The present invention is directed to the means and method by which the display registers are updated. This occurs whenever a procedure entry or a procedure exit extends beyond the scope of the current addressing environment. For example, in FIG. 2 one addressing environment would be set up during the execution of procedure A, whereas a second addressing environment would be required for the execution of the procedures B or C. The present invention is also directed to the means by which the address environment list is updated automatically during the procedure entry or a procedure exit which extends beyond the scope of the current addressing environment.

Briefly, an embodiment of the invention is in a system for processing information in stacks and includes means to automatically link stack areas together in a desired order when switching from one procedure to another. A memory is provided for storing stacks having different storage areas containing mark words each containing a value therein which references another mark word in a preselected order in which it is desired to link the areas together. A mark word is stored in the storage area currently in use which does not contain a mark word. A program word is stored in a stack area containing a reference to a different procedure in the memory means. A reference word is stored in a stack area currently in use having a value referencing a mark word for the stack area containing the program word. Means is provided for combining the value in the reference word with the mark word for the storage area currently in use and thereby provides a link therein to the stack area containing such program word.

Briefly, an embodiment of the invention in a data processing system for processing information in stacks also includes a memory for storing stacks of information for processing, the stacks having different stack areas each containing a mark word marking the beginning of the stack area. A program word is stored in a stack area and contains a reference to a different procedure in the memory. A plurality of display registers are provided and are arranged in a preselected order each storing the absolute address of one of the mark words for a current procedure. The program word contains a level value for the corresponding procedure identifying a display register. Means is provided for forming a series of addresses to which the display registers are to be set for the new procedure. A register is provided for storing the absolute address of the mark word for the stack area currently in use. Means is provided for storing the address contained in the last named means into the display register identified by the level value in the read out program word. Means is provided for storing the formed addresses in the order they are formed into others of the display registers in the preselected order of said registers and thereby update the display registers for the new procedure identified by the program word.

Briefly, a method, in accordance with one embodiment of the invention, for updating the display registers upon entering a new procedure, is as follows: An address is formed of one of the mark words. A signal is formed identifying one of the display registers. The address which is formed is stored into the identified display register. A mark word is obtained from the address which is formed. The displacement address of the obtained mark word is combined with the stored base of stack address to form the address of a further mark word. The signal identifying one of said display registers is incrementally changed to identify another display register. The steps starting with storing the address are repeated using such another display register and using the address of a further mark word thereby updating other display registers.

BRIEF DESCRIPTION OF THE DRAWINGS

FIG. 5 is an example of an actual ALGOL program used to illustrate the operation of the computer system of FIG. 1 in accordance with the present invention;

FIG. 7 also shows the address couples assigned to the various parameters and procedure references contained in the stack;

DESCRIPTION OF THE PREFERRED EMBODIMENT

Figure 1:
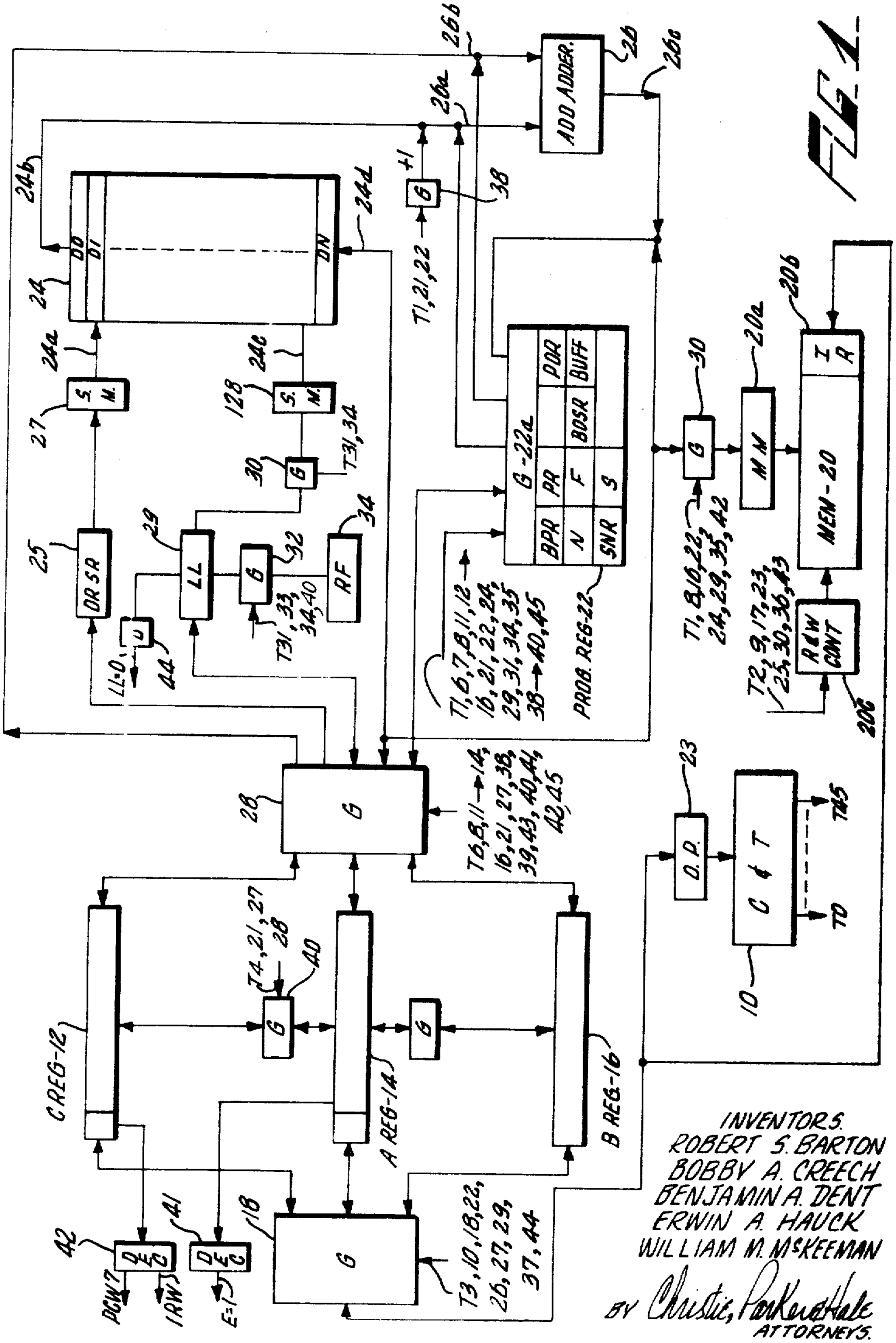
FIG. 1 is a block diagram of a data processing system and embodying the present invention.

Refer now to the major components in the computer system shown in the block diagram of FIG. 1 which embodies the present invention. The computer system contains three registers referred to as the C register 12, the A register 14 and the B register 16. The A and B registers together with a group of storage locations in a memory 20 form a stack mechanism. F and S sub-registers in a program register 22 store addresses for the memory locations in memory 20 and are used in keeping track of the memory locations being used as a stack. The A and B registers 14 and 16 form the top two storage locations of the stack and are time shared between stacks. Information is put into the A register and transferred down to the B register, then transferred down from the B register to the storage locations in the memory 20 forming the corresponding stack. This transfer is made via a gate 18 under control of a control and timing unit 10. Information is brought back out of the stack in reverse order and taken out of the top of the stack from the A register. As a word is taken out from the A register the information in the rest of the stack is effectively pushed up one position by appropriately changing the content of the S register, contained in the program register 22, which points at the top of the stack. The complete detail of operation of the stack is not essential for a complete understanding of the operation of the present invention and, therefore, only that part pertinent to the present invention is given. However, such a stack is described in detail in a book entitled "Electronic Digital Systems" by R. K. Richards published in 1966 by John Wiley & Sons, Inc. on pages 224 through 229.

An operator register 23 stores the operators for execution by the computer system of FIG. 1. The operator register 23 is coupled to the control and timing unit 10 for use in contiolling the sequence of operator of the system. Operators are obtained from the memory 20 and stored into the operation register 23 under control of the PR sub-register of the program register 22 in a conventional manner well known in the computer art. The details of this particular operation are not given herein.

The memory 20 is a conventional magnetic core memory system and operates in a manner well known in the computer art. It has an information register **20*b* and an address register (hereinafter referred to as the MM register) 20*a*, and a read and write control unit 20*c*. The address of the memory location into which information is written and from which it is read out is controlled by addresses stored in the MM register 20*a***.

The system also includes a memory having a group of display registers 24. The individual display registers 24 are referenced by the symbols D0 through DN. Each of the display registers 24 contains an absolute address of a memory location in the memory 20. To be explained in more detail, each display register that is used contains the absolute address of the beginning of a block of storage in a stack contained in the memory 20. Each absolute address is actually the address of a Mark Stack Control Word (MSCW) (see FIG. 1A) which is stored at the beginning of each block of storage.

The display registers 24 are formed of a group of transistor flip-flop circuits and all registers together form a memory. There are a group of input lines **24*a*, one line for each of the display registers, D1 through DN. A read signal on any one of the lines causes the content of the corresponding register to be read out and applied instantaneously on an output bus 24*b***.

Associated with the display registers 24 is a selection matrix 128 and a Display Register Selection Register (hereinafter referred to as the DRSR register) 25. A lexicographical level (*ll*) value, which is defined in more detail hereinafter, is stored in the DRSR register and designates a particular display register. The selection matrix 128 is responsive to a legicographical level (*ll*) value contained in the register 25 to provide a signal on the corresponding one of the read lines **24*a*, causing the content of the corresponding display register to be read out onto the bus 24*b*. A second group of input lines 24*c* is provided, one for each of the display registers. A write signal on one of the lines 24*c* causes an address to be written into the corresponding register. The address which is written is determined by signals applied in parallel to a group of input lines 24*d***.

Such a memory is disclosed in a copending patent application entitled Associative Memory Employing Non-Destructive Readout of Binary Elements filed in the name of Edwin S. Lee, III, on May 6, 1963 and given Ser. No. 278,021 which issued on Dec. 24, 1968 as Pat. No. 3,418,021.

A selection matrix 128 is coupled to the input lines **24*c* and determines the line to which a write control signal is applied. The selection matrix 128 is coupled to an LL register 29 through a gate 30. The LL register 29** also stores a legicographical level (*ll*) value which identifies the display register into which the selection matrix 128 is to cause a write operation.

An address adder 26 is provided and has two input buses **26*a* and 26*b*. The input bus 26*a* is coupled to the output bus 24*b* of the display register memory 24, and to the output of the program register 22. The input bus 26*a* is also coupled to a gate 38 which is capable of applying a signal representing the value 1 to the bus 26*a*. The input bus 26*b* is coupled through a gate 28 to the A, B and C registers 14, 16 and 12. The address adder 26 has an output bus 26*c* which is coupled to the program register 22 and to the MM register 20*a* via a gate 30 and to the A, B and C registers 14, 16 and 12 via the gate 28. The address adder 26 is a conventional parallel adder which combines the address signals applied on its input buses 26*a* and 26*b* and applies the sum to the output bus 26*c***.

An RF register 34 is provided for temporarily storing the lexicographical level (*ll*) value from the LL register 29. A gate 32 is provided for transferring information between the LL register 29 and the RF register 34. The gate 32 is also operative for causing the content of the LL register 29 to be counted down one unit at a time as described in more detail hereinafter.

The program register 22 can be considered as a large register with sub-registers therein, as indicated by the reference symbols in FIG. 1. A gate **22*a* causes information to be written in the appropriate sub-registers and causes information to be read out of the appropriate sub-registers under control of timing signals from the control and timing unit 10**.

The control and timing unit 10 is a conventional timing unit which operates in accordance with the flow diagram of FIG. 4. The control and timing unit 10 provides control signals at the output circuits referenced by the symbols T0 through T45. The sequence with which the timing signals are formed at the output circuits are indicated by the flow diagram of FIG. 4. In order to tie in the flow diagram of FIG. 4 to the timing signals formed by the control and timing unit 10, numbers are shown in parenthesis in FIG. 4, i.e. (0) (1, 2, 3), etc. These numbers correspond to the numbers following the letter T for the output circuits of the control and timing unit 10.

Decoders 41, 42 and 44 are connected to the A register 14, the C register 12 and the LL register 29, respectively. These decoders have output circuits connected to the control and timing unit 10 (connections are not shown). The decoders provide certain signals indicative of the content of the corresponding registers as described in more detail in the description of operation.

Parameters are generally located in the stack by a lexicographical level (*ll*) value plus an increment ($\delta$) value. These two values, in combination, are called an address couple. The lexicographical level selects one of the display registers 24 and the absolute address in the selected display register is added to the increment value ($\delta$) to give the absolute address of the desired parameter. The means for deriving an absolute address of a parameter using the address couple is disclosed in detail in the above-identified patent application entitled Stack Mechanism Having Multiple Display Registers. The present invention is directed to the means by which the address environment list and the content of the display registers are automatically updated during execution of a procedure entry operator. The update of the display registers for a procedure exit is similar to an entry and, therefore, is not described herein.

To fully appreciate the means and operation involved in updating the address environment list and the display registers, some of the ALGOL programming concepts involved will be given.

An actual example of a program expressed in ALGOL is shown in FIG. 5, and illustrates a condition wherein display registers must be updated. FIG. 5 is also the actual program represented by the stack of FIG. 3 and the address environment list of FIG. 2. The display update is required during a procedure entry under two conditions, namely (1) when a procedure enters another procedure which was passed to it as a parameter, and (2) during an entry when an expression is passed to a procedure by name rather than by value.

The ALGOL program of FIG. 5 is an example of when a procedure enters another procedure which was passed to it as a parameter.

Consider first what is meant by the expressions given in FIG. 5. Lines 1 and 29 indicate the beginning and end of the whole program and by definition also define the outer procedural block.

The expression PROCEDURE A(DOIT) at line 3 defines a procedure named A and that it uses the parameter which will be called DOIT. The following expression PROCEDURE DOIT means that DOIT is actually a subroutine procedure, as opposed to a variable.

The procedure A and its parameters are defined between lines 4 and 11. The expression REAL I,J defines two local variables to be called I and J. The expression $I \leftarrow 5$ indicates I is to be set to 5. The expression DOIT (I,J) means that the procedure DOIT is to be executed, using the parameters I and J in its computational steps. The expressions at lines 9 and 10, although not strictly ALGOL expressions, indicate what information is to be printed out on a printer.

The expression PROCEDURE B at line 13 defines another procedure known as B. The local entities and executable statements for B are defined from line 14 to line 26. The expression REAL K at line 15 defines a local variable called K.

The expression PROCEDURE C (X, Y) at line 16 defines a subroutine called procedure C. The two parameters to be used in procedure C are defined as X and Y. The expression REAL X, Y indicates that these parameters in procedure C are real numbers as contrasted to integer, Boolean variables, or other ALGOL entities.

The expressions at lines 17 through 20 actually define the parameters and steps involved in procedure C. The expression $Y \leftarrow X \otimes X$ means that the parameter X is to be squared and the result is to be placed where the parameter Y is stored.

Lines 22 through 25 are additional expressions for procedure B. The expression $K \leftarrow 1$ means that the parameter K (defined at line 15) is to be set to 1.

The expression A(C) is an action item and means that procedure A is to be called into operation using procedure C as the parameter for DOIT (at line 3). This is what was meant by entering another procedure (entering procedure A from B) passing procedure C as a parameter to procedure A.

The symbol B at line 28 means that the procedure B is to be called into operation. Procedure B is actually the first operational step that is called into operation. Procedure B calls procedure A into operation.

FIG. 5 has been divided into procedural blocks in accordance with the rules of ALGOL by the vertical lines at the lefthand side of FIG. 5. Also, program levels have been assigned to the blocks. These levels are indicated by the numerals at the top of the vertical line. The program levels are used in forming the addressing environment for the program.

Figure 2:
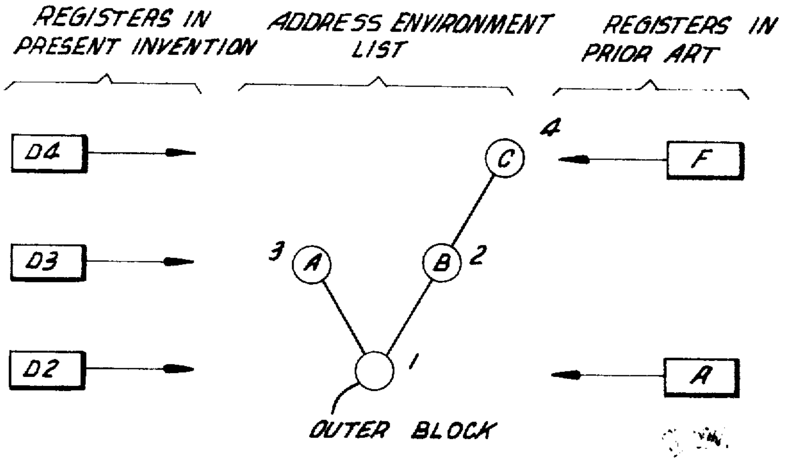
FIG. 2 is a sketch illustrating the tree structure of an example of the ALGOL address environment list including a showing of the registers in a prior art computer and the registers in the present invention.
Figure 3:
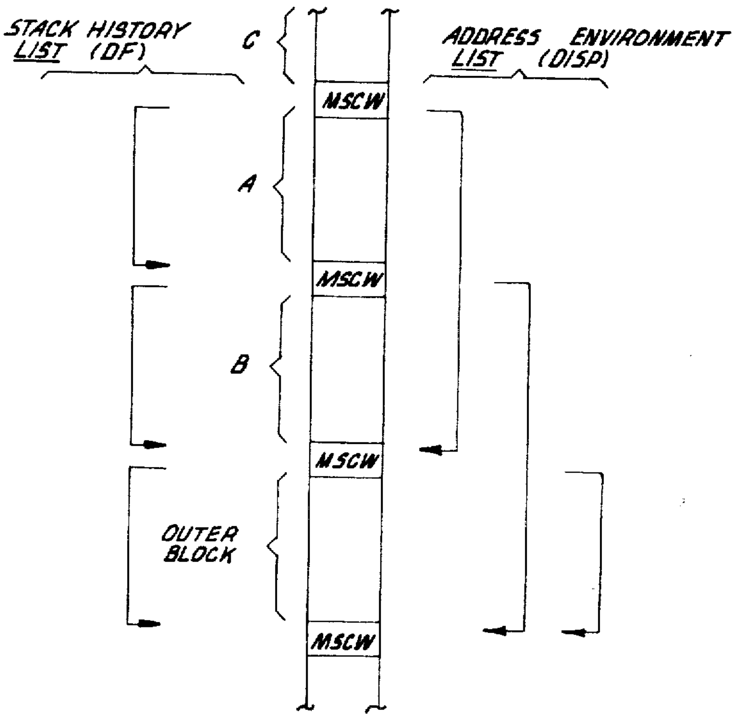
FIG. 3 is a sketch illustrating a stack showing the linkage of the stack history list and the linkage of the address environment list.

The address environment list is established when the program is structured by the programmer and is referred to as a lexicographical ordering of the procedural blocks. Referring to FIG. 2, which is a representation of the address environment list for the program of FIG. 5, the block "OUTER" represents the block starting at line 1 and ending at line 29 in FIG. 5. This procedural block is assigned a lexicographical level of 2. The block B of FIG. 2 begins at line 14 and ends at line 26 of FIG. 5. This procedural block is assigned a lexicographical level of 3. The block A of FIG. 2 begins at line 4 and ends at line 11 in FIG. 5. This procedural block also has a lexicographical level 3. The procedural block for procedure C in FIG. 2 begins at line 17 and ends at line 20 of FIG. 5. This procedural block is assigned a lexicographical level of 4.

The ALGOL program of FIG. 5 is compiled or translated into a machine code. This process is actually accomplished in the machine by a program called a compiler. In other words, it is translated into the actual machine instructions required for the particular computing system. In accordance with the present invention, the lexicographical ordering shown in FIG. 5 is used to form address couples.

The address couple consists of two items, (1) the lexicographical level (*ll*) of the parameter or procedural declaration, and (2) an index value ($\delta$) used to locate the specific parameter or procedural declaration within a lexicographical level. The lexicographical ordering of the program remains static as the program is executed, thereby allowing parameters to be referenced via an address couple as the program is executed. The address couple is converted into an absolute address when the parameter is referenced. This conversion utilizes the display registers 24 as disclosed and claimed in the above-identified patent application entitled Stack Mechanism Having Multiple Display Registers.

Briefly there is a display register for each lexicographical level (*ll*) of a program. The lexicographical level (*ll*) of an address couple is used to select a display register. The address register stores an absolute address which, when added to the index value, gives the address of the desired parameter.

Figures 6, 7:
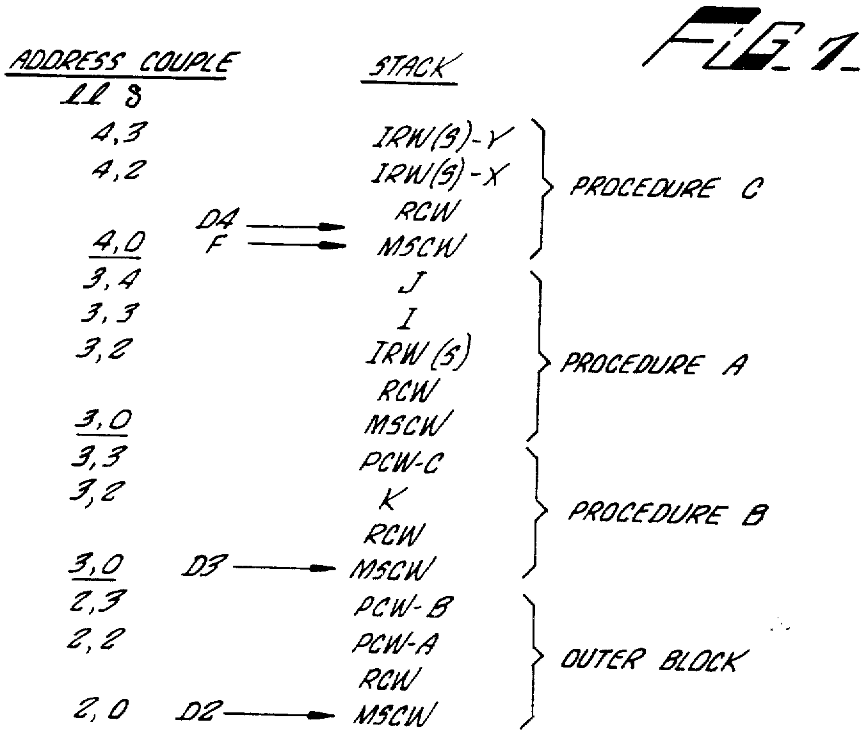
FIG. 6 is a table illustrating the variables and parameters that can be accessed by which procedures in the ALGOL program illustrated in FIG. 5, and includes an example of the address couples which would be assigned to the various procedures, variables and parameters.
FIG. 7 is a table showing an example of the content of a stack during the operation of the data processor of FIG. 1 which is described herein.

Refer now to FIG. 6 which is a table which would be prepared by the compiler showing which items can be accessed by which procedures and the address couples to be used. The table of FIG. 6 contains four columns. The one column shows the four procedural blocks shown in FIG. 5. Another column indicates the items which can be addressed or referred to within the procedural blocks. Another column shows an example of the address couples (*ll*, δ) that would be assigned to the various items shown in FIG. 5. As indicated in FIG. 6, the outer procedural block can reference or address the items A and B and are assigned the address couples 2, 2 and 2, 3, respectively. Procedure A can reference or address items A and B (defined in the outer procedural block) as well as the items DOIT, I and J which are declared or defined in procedure A. The corresponding address couples are shown. The other items and their address couples can be noted in the same manner.

Figure 1A:
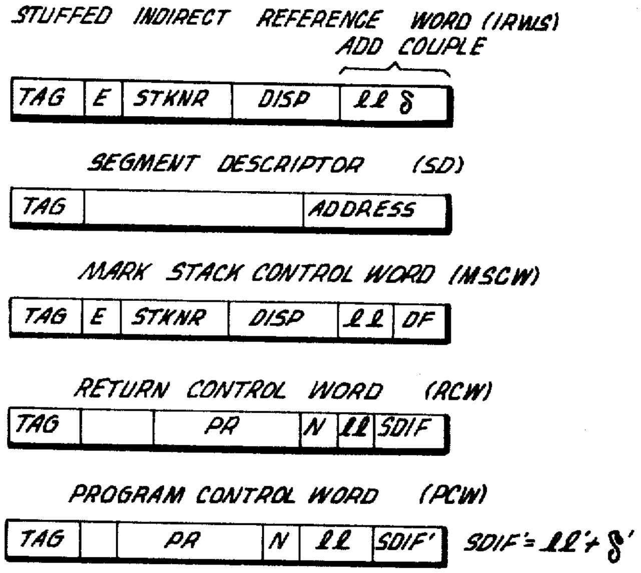
FIG. 1A is a sketch showing the word format of the reference words used in the computer system of FIG. 1.

Consider now the types of words of information stored in a stack. In general, the words stored in a stack are variables, reference words and control words of various types. FIG. 1A is a sketch which illustrates the word structure of the reference words and the control words used herein. The symbols used to abbreviate the various words are indicated in parenthesis. The words illustrated in FIG. 1A are composed of fields containing one or more bits of information. These fields are represented by various symbols. Table I gives an explanation of the various symbols used.

TABLE I

| Symbol: | Description of Symbols |
|---|---|
| TAG | Identifies type of word. |
| E | Identifies whether the corresponding word contains STKNR and DISP fields. |
| STKNR | Identifies the number of a stack. |
| DISP | A value which when added to the absolute address contained in the BOSR register gives the address of a MSCW. This value is used to link the MSCW's together to form the address environment list. |
| *ll* δ | This is an address couple. The *ll* portion is the lexicographical level of a particular item and points to a particular display register. δ is a value which when added to the content of the display register pointed to by *ll* gives the address of a desired item. |
| DF | A value which when subtracted from the address of the word in which this field was found gives the address of a MSCW. This is the value used to link the MSCW's together in order to provide the stack history list. |
| PR and N | Values which identify the state of the computer and the next operator to which the computer is to return following the entry into a new procedure. |
| SDIF | Contains a modified lexicographical level (*ll*′) and displacement field (δ′). The *ll* selects a display register to which (δ) is added to form an absolute address to locate the segment descriptor to which the computer is to return at the end of a subroutine or procedure. |
| SDIF′ | Contains a modified lexicographical level value (*ll*′) and displacement field (δ′). The ll′ points to a display register and δ′ is a value which when added to the content of that display results in the address of a segment descriptor which in turn contains the absolute address of another procedure. |

TABLE I.—Continued

| Symbol: | Description of Symbols |
|---|---|
| ADDRESS | A value contained in a segment descriptor (SD) which is the absolute address of the beginning of a procedure. |

The purpose of the above-listed items and the way in which they are used will be described in detail in the description of operation.

FIG. 7 shows an example of the content of a stack at one stage during the execution of the ALGOL program shown in FIG. 5. The address coupled assigned to the various words in the stack are shown at the lefthand side of FIG. 7. The words in the stack to which the display registers D2, D3 and D4 and the F register point by means of addresses contained therein are also indicated by arrows. The stack structure of FIG. 7 is of considerable importance and must be carefully noted in order to follow the operation of the computer system given hereinafter.

The lexicographical level (*ll*) of the address couple, (the first numeral of each pair of numerals in the address couple) identifies a display register which in turn contains the absolute address of a Mark Stack Control Word (MSCW) which is positioned at the base of a particular stack storage area. For example, lexicographical level (*ll*) 2 identifies display register No. 2 (D2) which in turn contains the absolute address of the MSCW at the base of the block OUTER. Referring to FIG. 6, it will be noted that the outer block has been assigned program level 2 and that each of the items which can be referenced in the outer procedural block contains a lexicographical level (*ll*) of 2. For example, the program control word PCW–A for procedure A is assigned an address couple 2,2 and the program control word PCW–B for procedure B is assigned an address couple 2,3. Referring to FIG. 7 the entities within each procedural block of storage are stored in consecutive memory locations. Thus, a particular item in a procedural block is referenced by adding the increment value (δ) to the absolute address contained in the corresponding display register. For example, the addresses of the program control words for procedures A and B (PCW–A and PCW–B) can be obtained by adding the increment values 2 and 3, respectively, to the absolute address contained in the display register No. 2 (D2). By a similar process the other parameters in the stack shown in FIG. 7 can be located.

Assuming the display registers D2, D3 and D4 have absolute addresses of the MSCW at the base of procedure blocks OUTER, B and C as shown in FIG. 7, parameters and reference words within the blocks OUTER, B and C can be obtained with reference to the respective display registers and hence are visible to the procedure being executed.

FIGS. 8A through 8E are sketches which illustrate the actual content of the stack shown in FIG. 7 at different times during an example of operation of the system. These figures also contain blocks and symbols representing the content of various registers which are of importance to an understanding of the present invention.

Figure 8A:
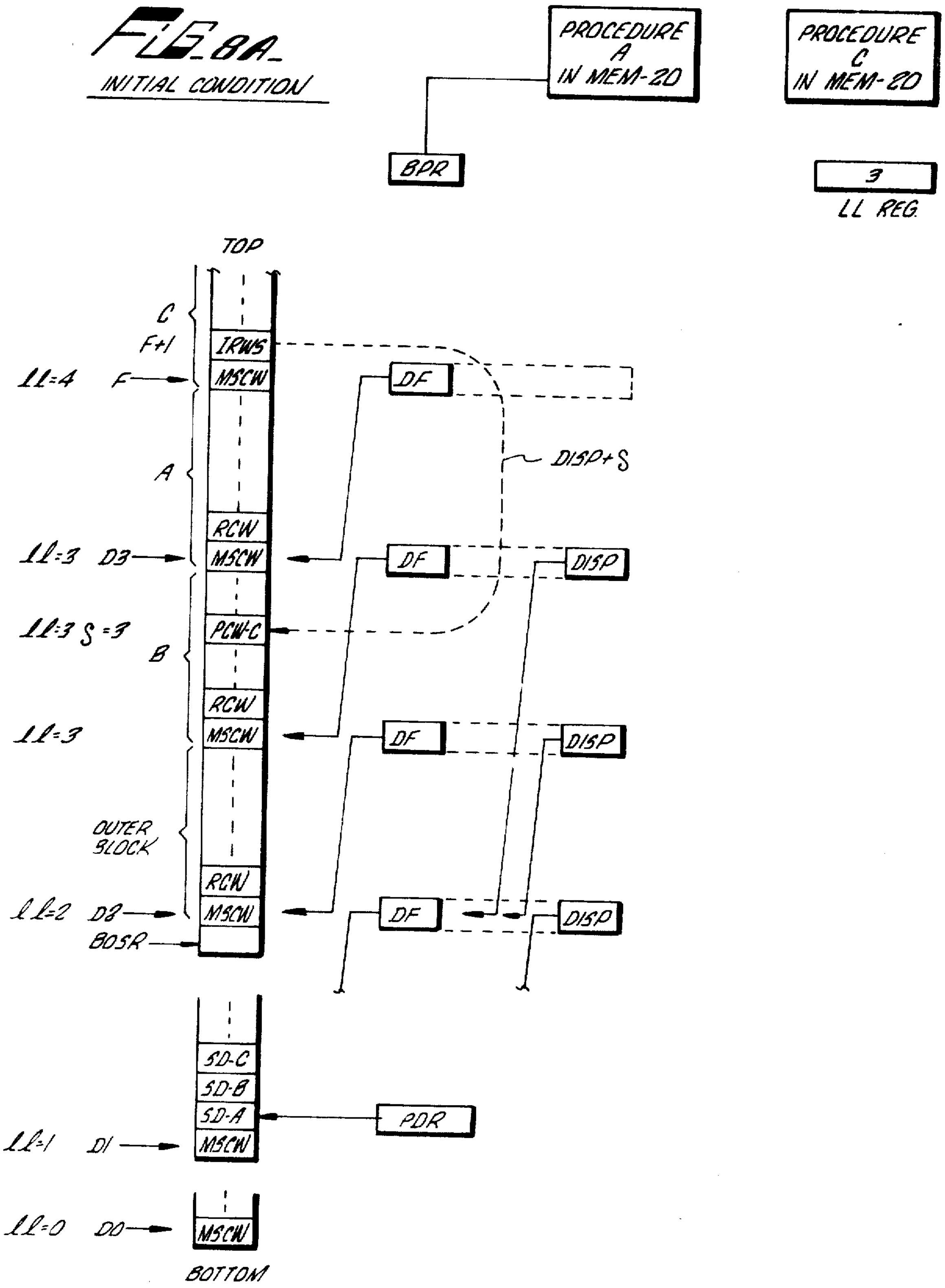
FIGS. 8A through 8E are sketches of the stack shown in FIG. 7 with portions deleted and illustrations of the content of various registers indicating the sequence of operation of the computer system of FIG. 1 during the example of operatiton described herein.

Refer now to FIG. 8A which illustrates the initial condition of the stack during the operation to be described herein and consider how the environment list of the stack has actually been formed using the MSCW's. The address environment list of the stack is formed by linking the MSCW's together by use of the STKNR and DISP fields (see FIG. 1A) in accordance with the lexicographical structure of the program and thereby indicate the address environment. This linkage information is contained within the STKNR and DISP field of the MSCW's. These fields are inserted into the MSCW's as each procedure is entered.

The BOSR of the program register 22 (see FIG. 1) contains the absolute address of the base of the stack currently in use. The stack history list is formed by linking the DF field of each MSCW back to the immediately preceding MSCW in the stack. The DF field contains a value which when subtracted from the absolute address of the immediately preceding MSCW in which the DF appears gives the absolute address of the MSCW to which the DF field is pointing. Thus, for example, in FIG. 8A, the DF field of the MSCW of procedure C points back to the MSCW of procedure A, the DF field of the MSCW of procedure A points back to the MSCW of procedure B, and the DF field of the MSCW of procedure B points back to the MSCW of the block OUTER. The word "point" is used as an abbreviated way to indicate that the value is such that it can be used to derive the address of the item pointed to.

The address environment list is formed using the DISP fields. Thus, for example, in FIG. 8A, the DISP field of the MSCW for procedure A points back to the MSCW of the block OUTER and the DISP field of the MSCW of procedural block B points back to the MSCW for the block OUTER.

It should be noted that the MSCW for the procedural block storage C does not contain a DISP field in FIG. 8A and for this reason is said to be incomplete. Before the operation to be explained hereinafter is completed a DISP field is automatically added into the incomplete MSCW which then points back to the MSCW for the procedural block B. The stack after the DISP field has been inserted in the MSCW is shown in FIG. 8C. This operation is referred to as updating the address environment list and will be explained in detail. Dashes are used in FIG. 8A as well as 8A through 8E to indicate that there is information in the stack which is not shown. The information not shown need not be considered for the example of operation set forth herein.

Display register D0 contains the address of the bottom of a stack area containing program information. The content of this stack area is not given and is not important to an understanding of the present invention.

Segment descriptors for procedures A, B and C (SD–A, SD–B, and SD–C) are stored in the bottom of the stack. The display register D1 is reserved for pointing at the base of the stack area containing the segment descriptors. The display register D1 contains the absolute address of the base of the segment descriptor storage area. The segment descriptors contain absolute addresses (ADDRESS, see FIG. 1A) which point to the machine language codes for the respective procedures A, B and C.

The next information of significance in the stack is a MSCW and a RCW which are in the storage area for the block OUTER. The RCW in the block OUTER contains the information and other data required to return the computer from the block OUTER procedure back to an operative program procedure upon completion of the example program.

Following the block storage for the block OUTER is the storage area for procedure B. Again, at the bottom of the storage area for procedure B is a MSCW and a RCW. The RCW in the storage for procedure B contains data which allows the computer to return to the block OUTER following the execution of procedure B. The next word of significance to the following operation is a PCW which points to the segment descriptor for procedure C (SD–C) which in turn points to procedure C. Stating it differently, the PCW contains an SDIF' field which has $ll'$ and $\delta'$ fields which are used to determine the absolute address of the segment descriptor (SD–C) which contains the base of the area containing the machine language code for procedure C.

The bottom two words in the storage area for procedure A are a MSCW and an RCW. The RCW in the storage area for procedure A contains the required information to return the computer from procedure A to procedure B after the procedure A has been executed.

As stated hereinabove at the base of the block storage for procedure C are a MSCW and an IRW and the MSCW is the incomplete MSCW. The stuffed IRW (IRWS) following the MSCW for storage area C contains a DISP field and a delta field ($\delta$) which point or reference to the program control word (PCW–C) stored in the storage area for procedure B. The DISP and $\delta$ fields when added together and added to the content of the BOSR register produce the absolute address of the PCW–C. Therefore, the DISP and $\delta$ are said to be values which reference the PCW–C.

Other initial conditions of the registers in FIG. 1 should be noted. As indicated, FIG. 8A, the BPR register of the program register 22 contains the absolute address of the base of the memory area containing the machine language code for procedure A. Procedure A is the one currently being executed. The LL register 29 contains a value 3 which is the level of the program or the lexicographical level for procedure A currently being executed. The PDR register of the program register 22 contains an absolute address which is the address of the segment descriptor for procedure A (SD–A).

To provide a better understanding of the operation of the system, a brief summary of the operation of the circuits shown in FIG. 1 will be given followed by a detailed description. Consider first the brief description of operation.

The system of FIG. 1 basically has five different phases of operation referred to as Phases I, II, III, IV and V. These phases of operation take place in response to an "ENTER" operator placed into the operator register 23 and utilize the stack shown in FIG. 8A in its initial condition. The five phases and a brief description of the operation during each phase follows. Reference should be made to the stack shown in FIG. 8A–8E during the following discussion.

BRIEF DESCRIPTION OF OPERATION

Phase I

Initially the control and timing unit 10 causes the stuffed indirect reference word (IRWS) stored in the stack storage area for procedure C to be read out of the memory 20. The IRWS points to PCW–C in the stack storage area for procedure B. The PCW–C is subsequently read out of the memory 20 and stored in the C register 12. Thus, the C register 12 now contains the PCW–C which points off in memory via the segment descriptor SD–C to the new procedure C which is to be executed.

Phase II

During Phase II the information in the PCW–C stored in the C register 12 is transferred to the program register 22 and to the LL register 29 in order to set them up to execute procedure C. Also the content of certain subregisters of the program register 22 and the LL register 29 are transferred to the C register 12 in order to generate an RCW. The RCW is then stored back into the stack at the place that the IRWS was read from and is used to return to procedure A when procedure C is complete.

Figure 8B:
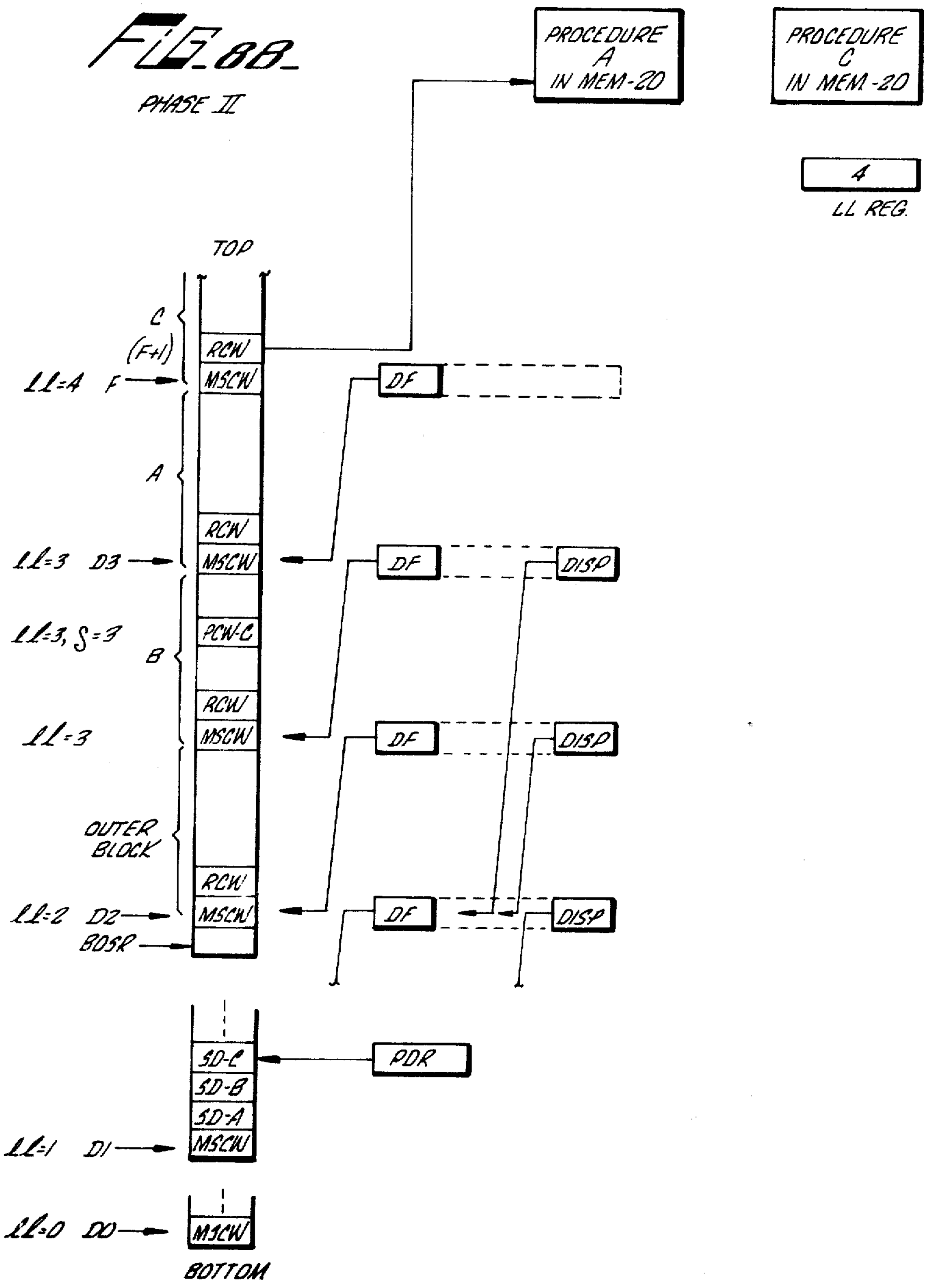
Figure 8C:
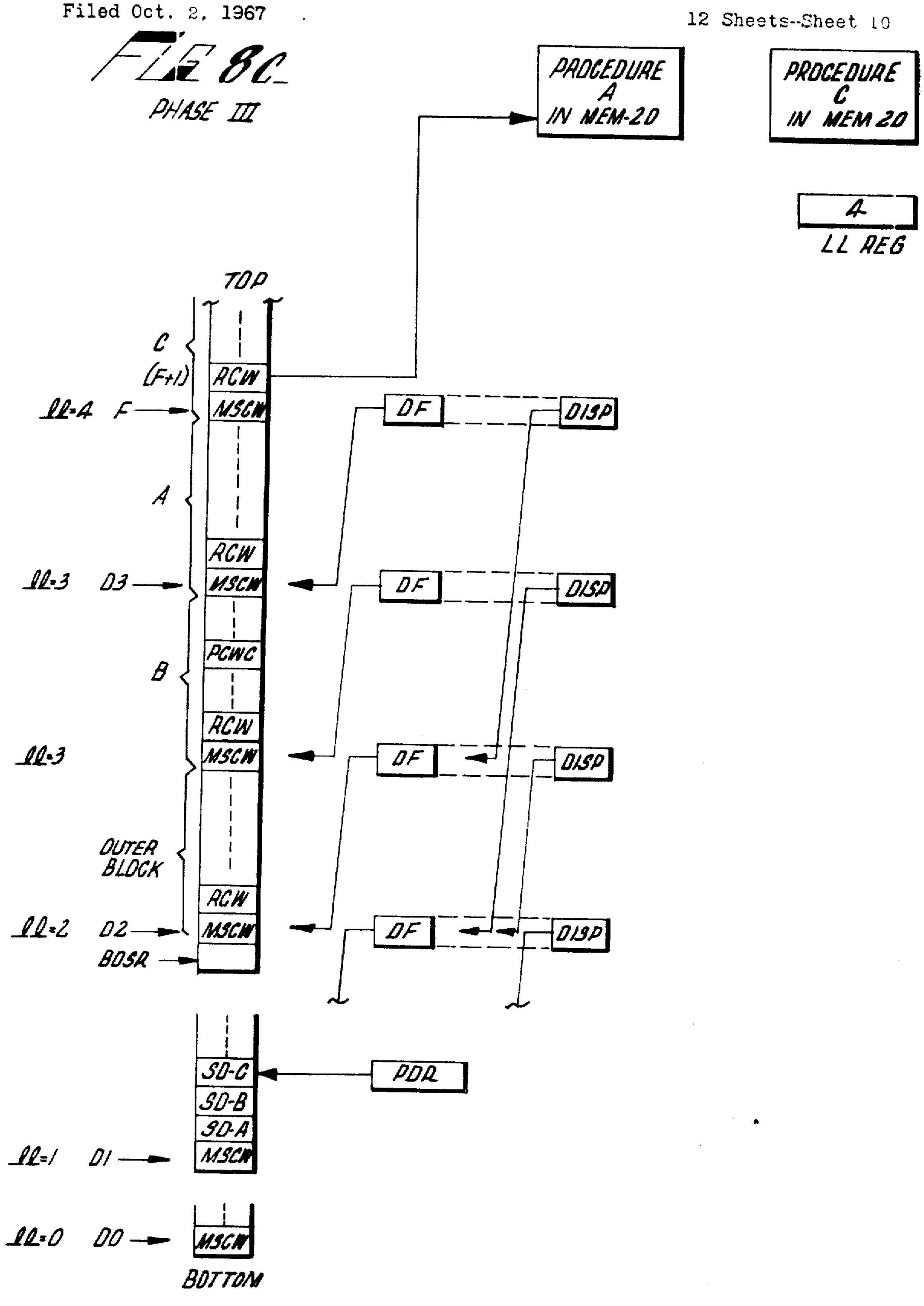

FIG. 8B shows the content of the stack and the indicated registers in the system of FIG. 1 following Phase II. As illustrated, the new RCW in the stack now points to the machine language code for procedure A and the PDR subregister of the program register 22 now points to the segment descriptor for procedure C (SD–C). Also the LL register 29 now contains the value 4 which is the lexicographical level for procedure C.

Phase III

During Phase III the DISP field of the IRWS formerly stored where the new RCW is now stored is combined with the incomplete MSCW to provide a complete MSCW with a linkage back to the MSCW at the base of the storage area for procedure B. Thus, the address environment list is dynamically updated. The condition of the stack and other registers following Phase III is shown in FIG. 8C.

Phase IV

Figure 8D:
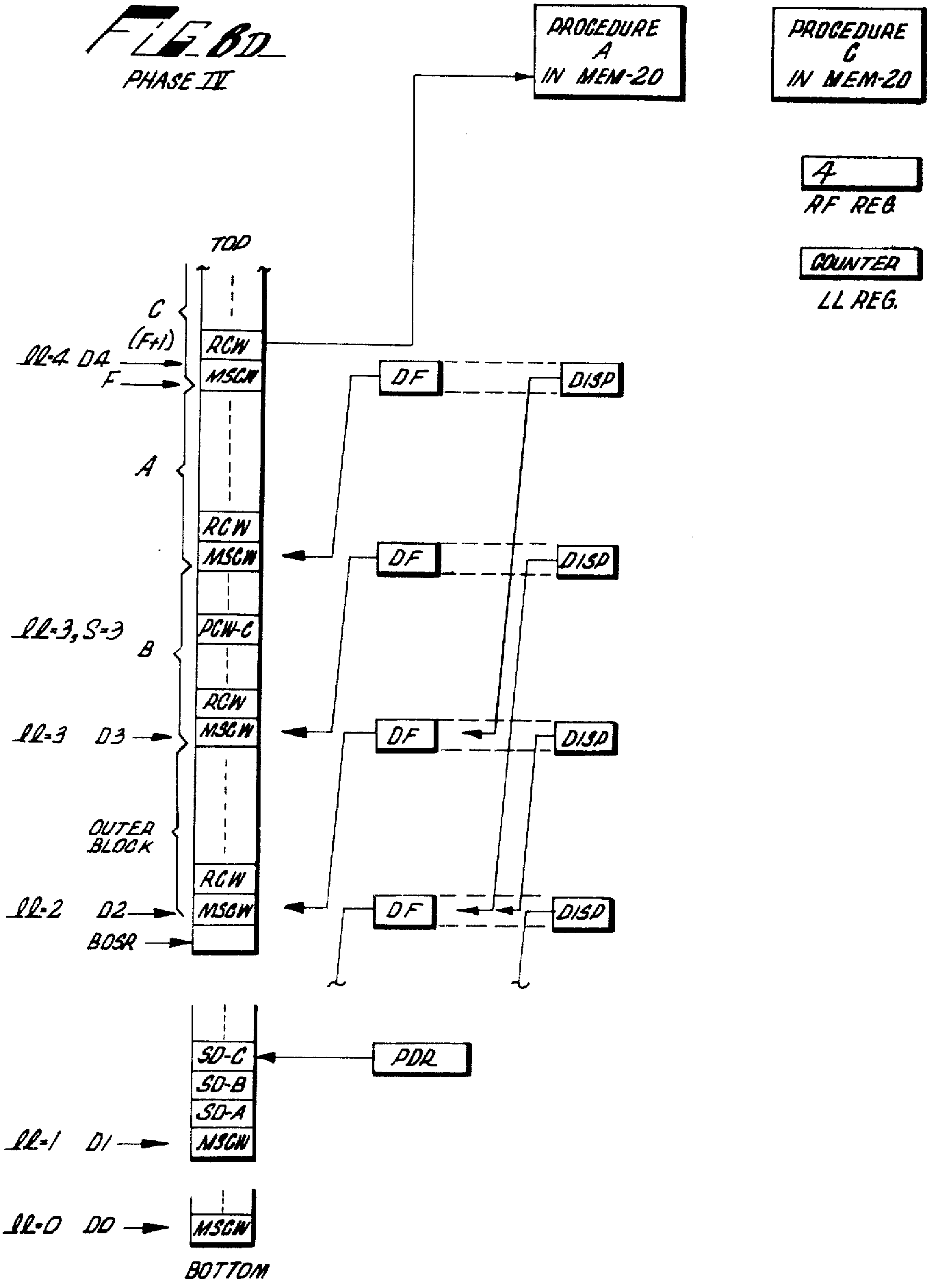

During Phase IV the display registers are updated. The update process is accomplished by changing the addresses contained in the display registers so they point at the correct MSCW's in the new stack areas for execution of the new procedure. The new procedure in this case is procedure C. As indicated in FIG. 8D, during Phase IV the display register 4 (D4) is set so that it now contains the absolute address of the MSCW at the base of the stack area for procedure C, display register 3 (D3) is set with an address which points at the MSCW at the base of the stack area for procedure B and the address contained in display register 2 (D2) again contains the address pointing to the MSCW at the base of the stack area for the block OUTER. Also the value 4 in the LL register 29 is transferred to the RF register for temporary storage so that the LL register can be used as a counter during Phase IV.

Phase V

During Phase V the segment descriptor for procedure C (SD–C) is obtained and the content thereof is used to derive the absolute address of the base of procedure C. This absolute address is stored into sub-register BPR of the program register 22. Also the LL register is restored to its previous value by transferring the contents of the RF register to the LL register.

DETAILED DESCRIPTION OF OPERATION

Figure 4C:
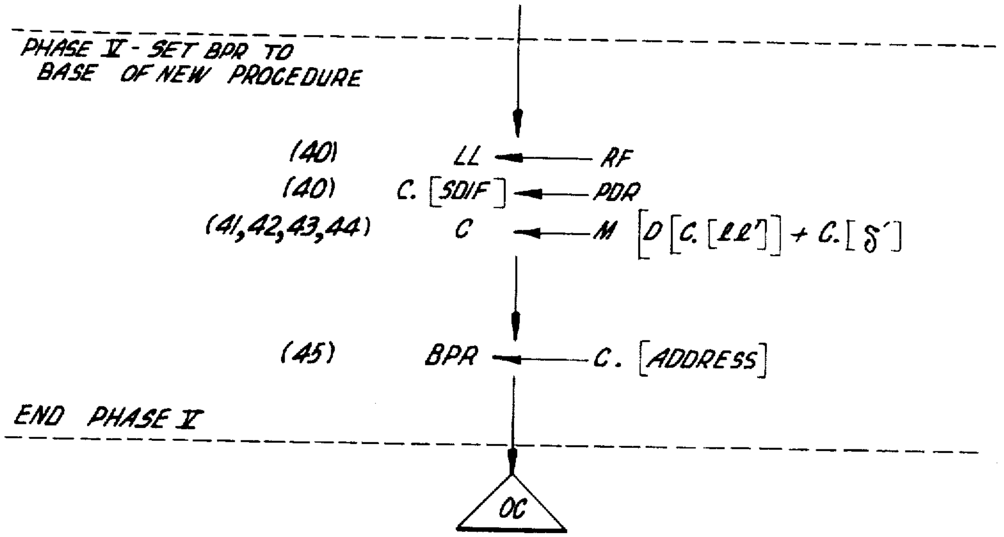
FIGS. 4A through 4C comprise a flow diagram illustrating the sequence of operation of the computer system of FIG. 1.
Figure 4A:
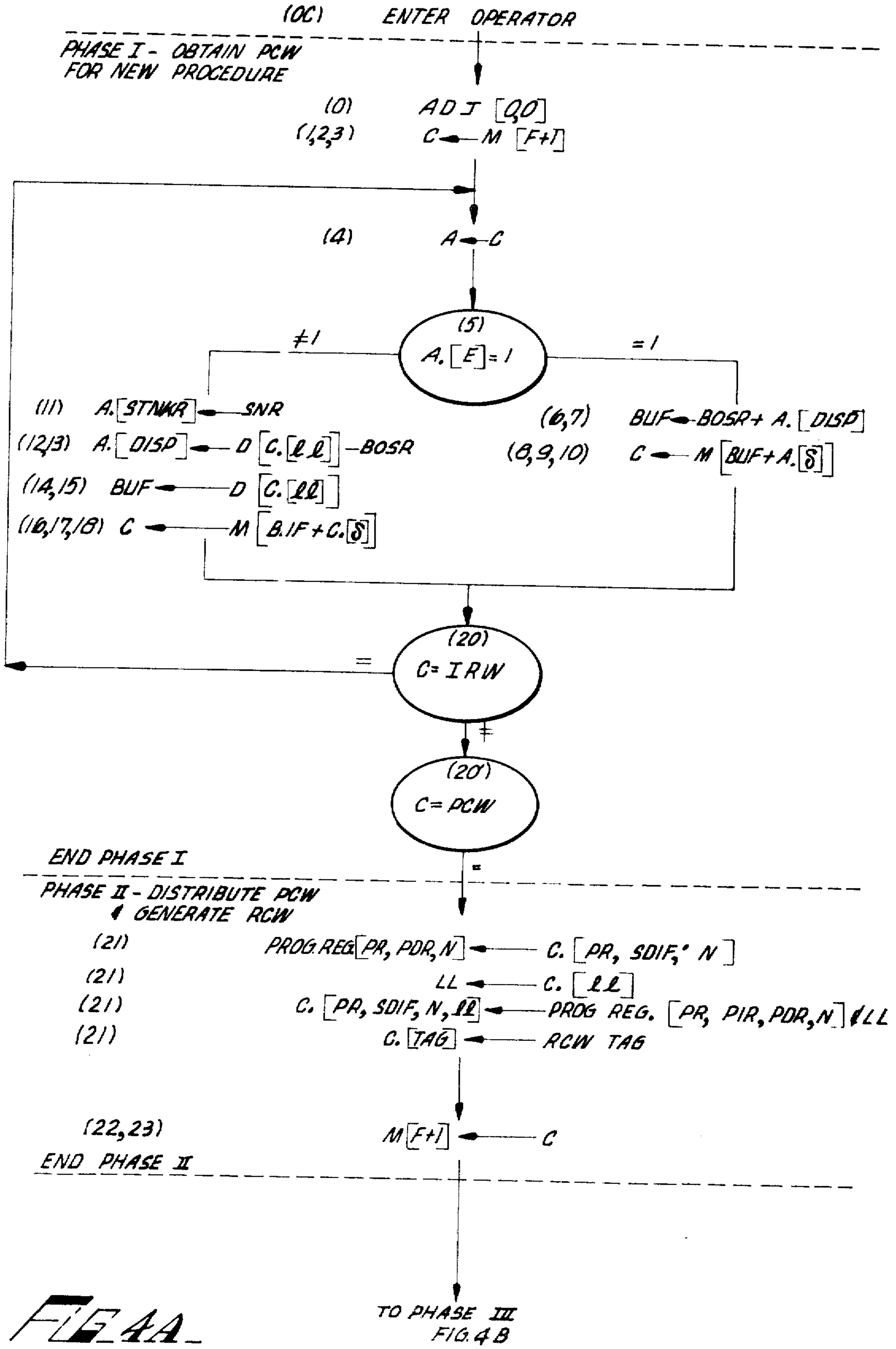
Figure 4B:
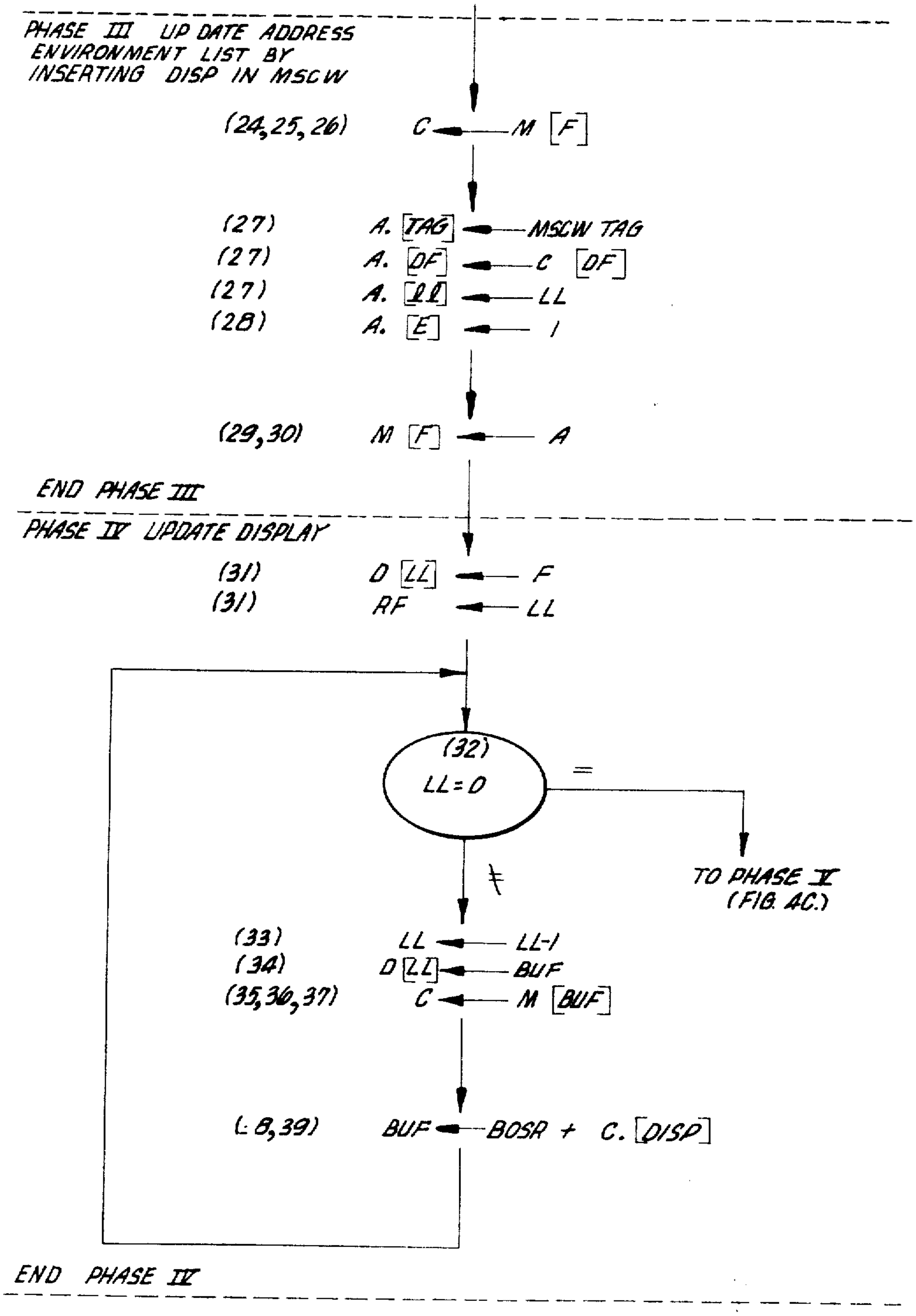

With the aforegoing description brief in mind, refer now to the details of the operation of the computer system of FIG. 1 with reference to the flow diagram of FIGS. 4A through 4C. The description will be given with reference to the operations during each phase. FIGS. 4A through 4C represent symbolically the sequence of operation of the system of FIG. 1. The numbers in the parenthesis, i.e. (0), (1, 2, 3) represent states of the control and timing unit 10 and the output circuits T0 through T45 which receive the timing signals for each state. FIGS. 4A through 4C should be followed in the following description for a complete understanding of the operation.

Phase I

During state 0 the control and timing unit 10 causes the ENTER operator to be read from memory and stored into the operator register 24 in a conventional manner in the computer art. The ENTER operator causes the control and timing unit 10 to initially go to state 0 where the stack is pushed down or adjusted such that the top two registers in the stack, namely the A register 14 and the B register 16, are empty. An explanation of the circuits and procedure to accomplish this operation are described in a copending application entitled Data Processor Having Operand Tags to Identify as Single or Double Precision, filed in the names of Robert S. Barton, Carl B. Carlson, Bobby A. Creech, Benjamin A. Dent, Erwin A. Hauck, Ser. No. 668,460, filed on Sept. 18, 1967 and assigned to the same assignee as this application. This operation, in brief, is accomplished by transferring the information in the A and B registers through the gate 18 into the memory 20 under control of the control and timing unit 10.

The control and timing unit 10 then forms control signals at the outputs T1, T2 and T3 in sequence. These control signals cause the address contained in the F register to be increased one unit and the corresponding memory location to be read out and stored in the C register 12.

Consider this operation. The control signal at T1 causes the gate 22*a* of the program register 22 to cause the address contained in the F register to be read out and applied to the input bus 26*b* of the address adder 26. The control signal at T1 also causes the gate 38 to apply a signal representing a value 1 to the input bus 26*a*. The address adder 26 immediately adds the value 1 to the address applied to the bus 26*b* and the result is applied to the output bus 26*c*. The control pulse at T1 also causes the gate 30 to store the address $(F+1)$ into the MM register 20*a*. The subsequent timing signal at T2 causes the read and write control unit 20*c* to initiate a read cycle in the memory 20 causing the content of the addressed memory location to be read out and stored into the information register 20*b*. The following control signal at T3 causes the gate 18 to store the information from the information register 20*b* into the C register 12.

It should be noted that the F register contains the address of the incomplete MSCW and that the next sequential memory location in the stack $(F+1)$ is the IRWS which is pointing to the PCW–C stored in the storage area for procedure B. Thus, at this time the C register 12 contains the IRWS.

The control signal at T4 causes the content of the C register 12 to be transferred by a gate 40 to the A register 14 so that the A register now contains the IRWS pointing to the PCW–C.

Following state 4 the control and timing unit goes into state 5. During state 5 a check is made to see whether the IRW stored in the A register is a stuffed IRWS or a regular IRW. If the indirect reference word is stuffed, then the E field contains a 1 value and the control and timing unit 10 goes on to states 6 and 7. However, if the E field contains a 0 value (is not equal to 1), then the control and timing unit 10 goes on to states 11 through 18.

In the example given herein the reference word is a stuffed IRWS, the E field being a 1. Therefore, the control and timing unit 10 goes on to states 6 and 7.

During states 6 and 7 the absolute address contained in the BOSR register is added to the DISP field contained in the A register. The result is the address of the MSCW at the base of the storage area for procedure B. During states 8, 9 and 10, the $\delta$ value of the indirect reference word in the A register is added to the result giving the address of the PCW–C. This resulting address is then used to address the memory and read out the program control word for storage into the C register 12.

Considering this operation in detail, the control signal at T6 causes the gate 22*a* to cause the content of the BOSR register of the program register 22 to be applied to the input bus 26*a* of the address adder 26. The control signal at T6 also causes the gate 28 to couple the DISP value of the IRWS contained in the A register 14 to the input bus 26*b*. The address adder 26 instantaneously adds the two values together and the sum is applied at the output bus 26*c*. The control signal at T7 causes the gate 22*a* to store the sum back into the BUFF register of the program register 22. The BUFF register is a temporary storage register used to temporarily store various information during the operation of the computer system. Following the control pulse at T7, the control pulses at T8, T9 and T10 are formed. The control signal at T8 causes the gate 22*a* to apply the content of the BUFF register to the bus 26*a* and causes the gate 28 to apply the $\delta$ value from IRW in the A register to the input bus 26*b*. The address adder 26 again adds the two values and this time forms the actual address of the PCW–C. The control signal at T8 also causes the gate 30 to store the resulting address into the MM register 20*a*. The control signal at T9 causes the read and write control circuit 20*c* to read out the content of the addressed memory location and store it into the information register 20*b*. The control signal at T10 causes the content of the information register 20*b* to be stored via the gate 18 into the C register 12. Thus, at the end of the control signal at T10 the C register 12 contains the PCW–C.

Following state 10, the control and timing unit 10 goes into state 20 where a check is made to see whether the word contained in the C register 12 is an IRW. If it is, then the control and timing unit 10 goes back to state 4 where states 4, etc. are repeated. The purpose of this loop is to read out another word, and this is repeated until a word is obtained which is a PCW and not an IRW. It should be noted that the decoder 42 connected to the C register 12 checks the tag field of each word as it is stored in the C register 12 and generates a control signal at the output circuit IRW each time an indirect reference word is stored. The outputs of the decoder 42 are connected back to the control and timing unit 10 for control of the operation thereof. When during state 20 a program control word is detected in the C register 12 by the decoder 42 it causes the control and timing unit 10 to go on to state 20' and then on to state 21, which is a part of Phase II.

It will be noted that had the IRW not been a stuffed IRW but a regular one, that the address couple (*ll*, δ) in the IRW would have been used to obtain the address of the desired PCW. A regular IRW is used when the reference is to a PCW within the addressing environment of the present procedure, as opposed to a stuffed IRW which refers to a PCW outside thereof. In the case of a regular IRW states 11 through 18 would have been entered rather than 6 through 10. The operations for the control signals at T11 through T13 cause certain operations which need not be considered in the present example of operation.

The control signal at T14 would cause the *ll* value in the C register to be transferred to the DRSR register 25 by the gate 28. This would cause the DRSR register and the selection matrix 128 to select and read out the address from the corresponding one of the display registers 24. The address is applied on the bus 26*a*. Since no address is applied on the other bus 26*b*, the address on 26*a* is applied unaltered to the bus 26*c*. The control signal at T15 causes the gate 22*a* to store the address into the BUFF register.

The control signal at T16 causes the gate 28 to apply the δ value from the C register to the bus 26*b* and simultaneously causes the gate 22*a* to apply the content of the BUFF register to the bus 26*a*. The adder 26 adds the two together and the result, applied on bus 26*c*, is the address of the desired PCW. The control signal at T16 also causes the gate 30 to store the result from bus 26*c* into the MM register 20*a*. The control signal at T17 causes the read and write control unit 20*c* to read out the PCW from the addressed memory location and store it into the information register 20*b*. The control signal at T18 causes the gate 18 to store the PCW from the information register 20*b* into the C register 12. The operation then continues as described hereinabove.

Continue now with the actual example of operation being explained herein.

Phase II

During Phase II the contents of certain registers in the program register 22 are interchanged with the content of the C register 12. The purpose of this interchange is to place an RCW in memory to which the computer is to return following the execution of procedure C and to set up the corresponding registers of the program register 22 for the new procedure C.

To this end, the control signal at T21 causes the gates 28 and 22*a* to store the content of the PR, SDIF' and N fields of the PCW–C contained in the C register 12 into the PR, PDR and N subregisters, respectively, of the program register 22. Additionally, the timing signal T21 causes the gate 28 to store the lexicographical level (*ll*) value of the PCW–C (a value of 4) contained in the C register 12 into the LL register 29. In addition, the timing signal at T21 causes the gate 40 to store a tag into the tag field of the C register 12 representing an RCW. Further, the control signal at T21 causes the gates 22*a* and 228 to store the contents of the PR, PIR, PDR and N subregisters and the LL register 29 into the PR, SDIF, N and fields of the C register 12, thereby forming an RCW. Thus, at the end of state 21 of the control and timing unit 10, the C register 12 contains an RCW, a tag to appropriately mark it and the program information required to return the computer to procedure A following the execution of procedure C.

During states 22 and 23 of the control and timing unit 10, the RCW contained in the C register is stored into the same memory location from which the corresponding IRWS was read. To this end the control signal at T22 causes gate 22*a* to read out the address contained in the F register onto the input bus 26*b* and causes the gate 38 to simultaneously apply signals representing a value of 1 to the input bus 26*a*. The address adder instantaneously forms the sum $(F+1)$ on the output bus 26*c*. The control signal at T22 also causes the gate 30 to store the resulting address into the MM register 20*a* and causes the gate 18 to store the RCW from the C register into the information register 20*b*. The control signal at T23 causes a read cycle during which the RCW is stored into the addressed memory location $(F+1)$.

This new storage condition of the stack is reflected in FIG. 8B. It will also be noted that FIG. 8B reflects that the content of the PDR register has been changed and that it now contains the absolute address of the segment descriptor for procedure C (SD–C), that the LL register 29 now contains a value 4 which is the lexicographical level of procedure C and the RCW related to the procedure C storage area of the stack points back to machine language code for procedure A.

Phase III

During Phase III the incomplete MSCW stored at the bottom of the stack area for procedure C is completed by putting in the DISP field. The DISP references the MSCW at the bottom of the stack for procedure B. It should be noted at this point that the A register 14 still contains the IRWS which was read from the memory location $F+1$ of the stack area for procedure C. This IRWS was inserted in the stack and contains the DISP field which references the MSCW at the bottom of the stack area for procedure B. This DISP field is the one which is placed into the incomplete MSCW. It should also be noted carefully that rather than reading out the MSCW at the base of procedure C and inserting the DISP field into that word, that the MSCW is read out and various parts thereof are stored around the DISP field of the IRWS contained in the A register 14 to form the complete MSCW. To this end, the control and timing unit 10 goes through states 24 through 30.

The control signal at T24 causes the content of the F register of the program register 22 to be applied to one of the input buses to the address adder 26. The other input bus does not carry any signals, and accordingly the address adder 26 applies the address from the F register, unaltered, to the output bus 26*c*. The F register and hence the bus 26*c* carry the address of the MSCW at the base of the storage for procedure C. The control signal at T24 also causes the gate 30 to store the address into the MM register 20*a*. The control signals at T25 and T26 cause the memory to read out the MSCW from the addressed memory location and causes the gate 18 to store the MSCW into the C register 12 in a manner similar to that described above.

During state 27 of the control and timing unit 10, the tag for the IRWS contained in the A register 14 is changed to a MSCW tag and the other information from the MSCW is transferred from the C register 12 to the A register 14 around the DISP field of the IRW contained therein.

To this end, the control signal at T27 causes the gate 40 to place a MSCW tag into the tag field of the A register and place the DF field of the MSCW contained in the C register 12 into the DF of the IRWS contained in the A register 14. Also the control pulse at T27 causes the gate 28 to transfer the contents of the LL register 29 into the *ll* field of the A register 14. A control pulse at T28 causes the gate 40 to store a 1 value into the E field of the A register 14. Thus, the A register 14 now contains a complete MSCW with a DISP field. The complete MSCW is now ready and stored back into the bottom of the stack area for the procedure C from which the incomplete MSCW was read.

To this end, the control pulse at T29 causes the address contained in the F register to again be applied to the address adder 26 and then stored unaltered into the MM register 20*a* in a similar manner to that described hereinabove. Additionally the control signal at T29 causes the gate 18 to store the complete MSCW from the A register 14 into the information register 20*b*. The control signal at T30 causes the complete MSCW to be stored back into the memory location specified by the address contained in the MM register 20*a*.

Referring to FIG. 8C, it will be noted that following Phase III the stack now contains the complete MSCW with a DISP field which points back to the MSCW stored at the base of the storage area for procedure B.

Phase IV

During Phase IV the display registers are updated by putting new addresses into them. As a result, the display registers will reflect the stack condition for the new procedure C. To this end, the control and timing unit 10 enters states 31 through 39.

FIG. 8C reflects the condition of the registers at the end of Phase III. The LL register contains the value 4. The value 4 was placed in the LL register during Phase II and was obtained from the PCW–C. The value 4 in the LL register is the level of procedure C (see FIG. 5).

The control signal at T31 causes the gate 22*a* to apply the content of the F register to the bus 24*d* and causes the LL register to be coupled to the selection matrix 128. The write signal from the selection matrix 128 causes the address from the F register to be stored into the display register D4 specified by the value in the LL register 29. Therefore, following the control signal at T31, the display register D4 points to the MSCW at the base of the stack area for procedure C. This condition is reflected in FIG. 8D which shows the condition of the registers at the end of Phase IV.

Continuing on with the operation during Phase IV, the control signal at T31 also causes the gate 32 to store the content of the LL register 29 into the RF register 34. The RF register 34 serves as a temporary storage for the level value (*ll*) for the new procedure to enable the LL register 29 to be used as a counter in the following sequence of operation.

Following state 31 the control and timing unit 10 goes into state 32 where a check is made to see if the content of the LL register 29 is zero.

The decoder 44 provides an output signal at the output circuit LL=0 when the LL register 29 is zero. States 32 through 39 form a loop in which the computer stays until the content of the LL register 29 has been reduced to zero. Each time the loop is entered the content of the LL register 29 is counted down one unit. When the content of the LL register 29 has been reduced to zero and the decoder circuit 44 forms a control signal at LL=0 which causes the control and timing unit 10 to go from state 32 to states 40 to 45.

Consider now the loop between the states 32 through 39. During state 33 the control signal at T33 causes the gate 32 to count the content of the LL register 29 down by one unit. In the example being explained at this time, the LL register 29 has been reduced from a value of 4 to a value of 3. The control signal at T34 causes the content of the BUFF register to be transferred to the content of the display register D3, which is now specified by the LL register 29, in the manner described for the pulse at T31.

It should be noted carefully that the BUFF register now contains the address of the MSCW word at the base of the stack area for procedure B. This value was stored into the BUFF register during state 7 of Phase I and has remained there unaltered. Thus, the display register D3 now contains the address of the MSCW at the base of the storage for procedure B.

During states 35, 36 and 37 the MSCW at the base of the stack area for procedure B is read out. The purpose of obtaining this MSCW from memory is to obtain its DISP field and use it to compute the address of the next MSCW in the stack area for the lexicographical chain. This address will be placed into the number of the display register now pointed to by the LL register 29 minus 1, i.e. D2.

The control signal at T35 causes the address contained in the BUFF register to be read out coupled through the address adder 26 to the gate 30 which stores the address into the MM register 20*a*. The control signals at T36 and T37 cause the content of the addressed memory location, namely the MSCW, at the base of the stack area for procedure B to be read out and then stored into the C register by the gate 18. The MSCW now stored in the C register 12 contains another DISP value. This DISP value points back to the MSCW at the base of the stack area for the block OUTER.

The control signal at T38 causes the gate 28 to apply the DISP field contained in the C register 12 to the input bus 26*b* of the address adder 26. Simultaneously, the control signal at T38 causes the gate 22*a* to apply the content of the BOSR register to the input bus 26*a*, and the address adder 26 combines the two values together to form the address of the MSCW stored at the base of the storage area for the block OUTER. The control signal at T39 causes the gate 22*a* to store the result back into the BUFF register.

The control and timing unit 10 now goes from state 39 back to state 32 and since the LL register 29 contains a value of 3 and not 0, states 33 through 39 are again entered. During state 33 the content of the LL register 29 is again counted down by one value so that it now contains a value of 2 and, therefore, points to display register D2. During state 34 the address of the MSCW contained in the BUFF register is stored into the display register D2 in a similar manner to that described above. It will be noted that the address in the display register D2 is actually the same after update as before.

Thus, referring to FIG. 8D, display registers D2, D3 and D4 all contain the address of the MSCW's for their corresponding stack storage area. The computer system remains in the loop consisting of states 32 through 39 causing the LL register 29 to be counted down and display registers D1 and D0 updated in a similar manner to that described for the display registers D2 through D4. When this has been done, the state of the LL register 29 will have been reduced to zero and the control and timing unit 10 will go from state 32 to states 40 through 45 where Phase V is entered.

Phase V

During Phase V the segment descriptor SD–C for the new procedure, namely procedure C, is obtained from the base of the stack and the address contained in the segment descriptor is used to set up the BPR register so that it points at the base of the new procedure C.

To this end, the control signal at T40 causes the gate 32 to store the level of the current procedure, namely level 4, back into the LL register 29. The PDR register contains the value of the SDIF' field obtained from the PCW–C which was stored during Phase II. Additionally, the control signal at T40 causes the content of the PDR register to be applied to one of the input buses to the address adder 26 and since no other input is applied, the address adder 26 applies the address unaltered to the output bus 26*c*. The gate 28 stores the address from the output bus 26*c* into the SDIF field of the C register 12. As pointed out hereinabove, the SDIF' field contains a special lexicographical level *ll'* and a special δ' field. The lexicographical level *ll'* points to display register D1 which is the display register which points at the MSCW stored at the bottom of the stack containing the segment descriptors. The δ' field is a value which when added to the absolute address contained in the display register D1 forms the absolute address of the segment descriptor for procedure (SD–C).

During states 41 through 44 the system of FIG. 1 reads out the segment descriptor SD–C and stores it into the C register 12. To this end, the control signal at T41 causes the gate 28 to store the lexicographical level value $ll'$ into the DRSR register 25, and the selection matrix 128 selects display register D1, causing the absolute address contained therein to be read out and applied to the input bus 26*a*. The control signal at T42 causes the gate 28 to apply the $\delta'$ field contained in the C register to the input bus 26*b*. The address adder 26 adds the two values together and forms the absolute address of the segment descriptor SD–C. The control signal at T42 causes the gate 30 to store the resulting address from the address adder 26 into the MM register 20*a*. A control signal at T43 causes the read and write control unit 20*c* to start a memory cycle and read out the segment descriptor SD–C. The control signal at T44 causes the gate 18 to store the segment descriptor from the information register into the C register 12.

With reference to FIG. 1A, it will be noted that a segment descriptor contains an address. In SD–C this is the address of the base of procedure C. This address is the one which is to be stored into the BPR register for use during execution of procedure C. To this end, the control signal at T45 causes the gates 28 and 22*a* to store the address field from the C register into the BPR register of the program register 22.

Figure 8E:
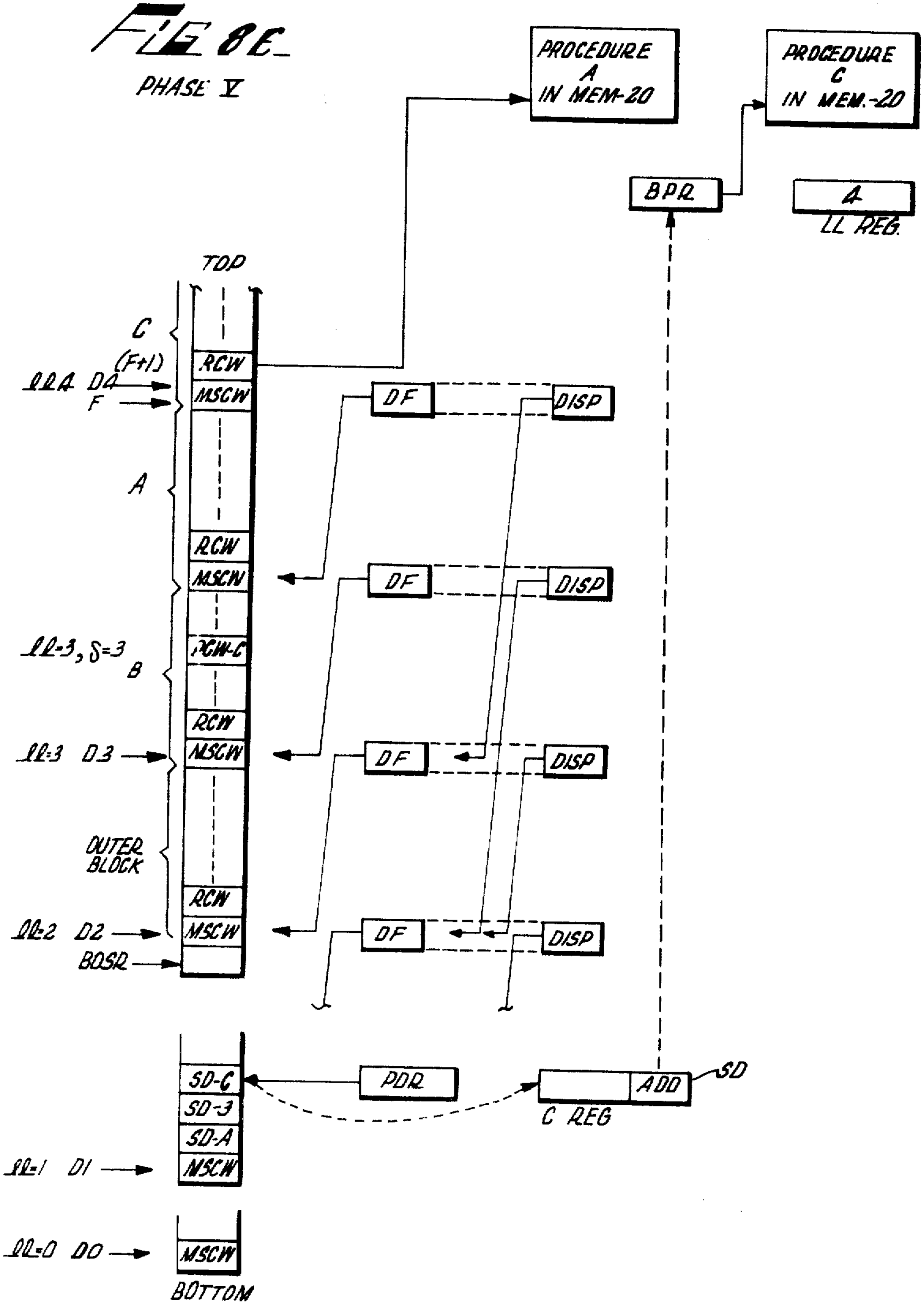

Referring to FIG. 8E, it will be seen that at the end of Phase V all of the display registers have been appropriately set and the register BPR appropriately references the base of the code containing procedure C.

Following state 45, the control and timing unit 10 automatically goes to the operation complete state and other operators are brought out and stored in the operator register 23 and executed.

The problems of the prior art and their solution by means of the present invention have been given with reference to the programming language known as ALGOL. However, similar problems exist and the solutions to these problems by means of the present invention is equally applicable to other languages that are similar to ALGOL. These languages are known as ALGOL-like languages. One example of an ALGOL-like language is known as PL/I and is defined in the report entitled "IBM System 360 Operating System PL/I Language Specifications," published by the IBM Corporation in December 1966 and identified as IBM SRL C–6571–3.

Although one example of the present invention has been shown by way of illustration, it should be understood that there are many other rearrangements and embodiments of the present invention in the scope of the following claims.

What is claimed is:

1. In a data processing system having a memory for storing stacks of information for processing and a plurality of display registers each for storing a different absolute memory address of a base of a stack area used to store information words for a particular level of a program, a mark word stored at the base of each stack area each mark word containing a displacement value referencing another mark word in a preselected order in which it is desired to link stack areas together, a program word stored in a stack area and containing a reference to a new procedure in memory for execution and having a value therein representing the level of such procedure the combination comprising means for reading out said program word, a register for storing the absolute address of the base of the stack currently in use, means for combining the stored base of stack address with the displacement value of each mark word read from memory to derive the addresses of the mark words in the preselected order, said read means additionally being operative to read out the mark words specified by the derived addresses, means for counting settable to an initial state corresponding to the level value of the read out program word and for counting relative thereto each state providing an indication of a different one of said display registers, a register storing the absolute address of the mark word for the stack area currently in use and means for storing the address from the last named register means into the display register identified by the initial state of said counting means and additionally storing the derived addresses one by one into the display registers indicated by the other states of the counting means and thereby automatically update the display registers as each different procedure is entered.

2. In a data processing system for processing information in stacks, the combination comprising memory means for storing stacks of information for processing, the stacks being divided into stack areas and having a different mark word stored at the beginning of each of said stack areas, each mark word having a displacement value which references another mark word in a preselected order in which it is desired to link the stack areas together, a program word stored in a stack area containing a reference to a new procedure in the memory means for execution and containing a level value for the corresponding procedure, a plurality of display registers each storing the absolute address of a different one of the mark words for a current procedure, counting means settable to an initial state corresponding to the level value of such stored program word and for providing a series of counts starting therewith each of which identifies a different one of said display registers, a register for storing the absolute address of the base of the stack currently in use, means for reading out the mark words from said memory means in a predetermined order, means for combining the displacement value in each mark word with the base of stack address to derive the absolute addresses of the mark words in the predetermined order, register means for storing the absolute address of the mark word for the stack area currently in use, means for storing the address from the last named register means into the display register designated by the initial state of the counting means, and means for individually storing each of the derived absolute addresses formed by the last named means into a different one of the display registers identified by the other counts of said counting means and thereby update the display registers for the new procedure.

3. In a data processing system for processing information in stacks, the combination comprising memory means for storing a plurality of stacks of information for processing, each being divided into stack areas and having a different mark word positioned at the beginning of each of said stack areas, each mark word having a reference value which references another mark word in a preselected sequence in which it is desired to link the stack areas together, a program word stored in a stack area and containing a reference to a new procedure in the memory means, a plurality of display registers arranged in a preselected order each for storing the absolute address of one of the mark words for a current procedure, the program word containing a level value for the corresponding procedure identifying a display register, means for reading the mark words out of the memory means in the preselected sequence and additionally for reading out the program word, means coupled to the reference values in the read mark words for forming a series of absolute addresses to which the display registers are to be set, a register for storing the absolute address of the mark word for the stack area currently in use, means for storing the address contained in the last named register into the display register identified by the level value in the read out program word, and means for storing the formed addresses in the order they are formed into others of the display registers in the preselected order thereof and thereby update the display registers for the new procedure identified by the program word.

4. In a data processing system for processing information in stacks and including means to automatically link stack areas together in a desired order when changing from one procedure to another, the combination comprising memory means for storing a plurality of stacks of information for processing, the stacks being divided into stack areas and having a different mark word positioned at the beginning of each of said stack areas, each mark word having a displacement value which references another mark word in a preselected order in which it is desired to link the stack areas together, an incomplete mark word being stored at the beginning of a storage area currently in use which does not have said displacement value therein, a program word stored in a stack area and containing a reference to a new procedure in the memory means, a reference word stored in said stack area currently in use having a displacement value referencing said mark word positioned at the beginning of the stack area containing the program word, means for selectively reading out the reference and mark words contained in the stack area currently in use, means for combining the displacement value in the reference word with the content of the read out mark word and thereby provide a link in the mark word to the stack area containing such program word and means for storing the modified mark word back at the beginning of the stack area currently in use.

5. In a data processing system for processing information in stacks and including means to automatically link stack areas together in a desired order when changing from one procedure to another, the combination comprising memory means for storing stacks having different storage areas each containing mark words, each mark word containing a value therein which references another mark word in a preselected order in which it is desired to link the areas together, a mark word not containing said value being stored in a stack area currently in use, a program word stored in a stack area containing a reference to a new procedure in the memory means, a reference word stored in said stack area currently in use having a value referencing a mark word for the stack area containing the program word, and means for combining the value in the reference word with the mark word for the storage area currently in use and thereby provide a link therein to the stack area containing such program word.

6. In a data processing system for processing information in stacks, the combination comprising memory means for storing stacks of information for processing, the stacks having different stack areas each containing a mark word marking the beginning of the stack area, a program word stored in a stack area and containing a reference to a new procedure in the memory means, a plurality of display registers arranged in a preselected order each storing the absolute address of one of the mark words for a current procedure, the program word containing a level value for the corresponding procedure identifying a display register, means for forming a series of addresses to which the display registers are to be set for the new procedure, a register for storing the absolute address of the mark word for the stack area currently in use, means for storing the address contained in the last named means into the display register identified by the level value in the read out program word and means for storing the formed addresses in the order they are formed into others of the display registers in the preselected order of said registers and thereby update the display registers for the new procedure identified by the program word.

7. In a data processing system as defined in claim 5 including a register for storing the address of the mark word stored in the stack area currently in use, means for combining a predetermined value with such mark word address stored in the register for forming the address of said reference word, means for addressing said memory with the stored mark word address and the formed reference word address and including means for causing the corresponding mark word and reference word to be read out from the memory means and first and second register means for respectively storing the read out mark and reference words while the value in the reference word is combined with the mark word.

8. In a data processing system as defined in claim 7 wherein said addressing means includes means for again addressing said memory means with the stored mark word address and including means for causing the combined reference word to be stored back into the same memory location from which the mark word was read.

9. In a data processing system for processing information in stacks the combination comprising, memory means for storing a plurality of stacks of information for processing, each stack having different stack areas and each stack area having mark word, each mark word having a reference value which references a mark word for another stack area in a preselected sequence, a plurality of display registers each for storing the absolute address of a different one of the mark words for a current procedure, means for storing the address of the base of the stack containing the stack areas corresponding to the addresses in said display registers, means for reading out the mark words for a new sequence of stack areas, means for combining the reference value in each such mark word with the stored base address and for forming the address of the next mark word in such sequence, said reading means being operative for reading out the mark word at each mark word address formed by said combining means, said combining means also being operative for combining the reference value in each of the other mark words read from the memory with the stored base address and thereby form the addresses of each of the other mark words in the predetermined sequence, counting means having a sequence of states each corresponding to a different one of said display registers and means for causing said counting means to count to a different state for each new address which is formed, means for setting said counting means to an initial state and means for storing each of said addresses which are formed into the display register indicated by the corresponding state of the counting means and thereby update the display registers for the new sequence stack areas.

10. In data processing apparatus comprising memory means for storing a plurality of stacks of information each stack having a plurality of different mark words positioned in different stack areas, each mark word having a reference value referencing another mark word in a preselected sequence for linking stack areas together, a plurality of display registers each for storing the absolute address of one of a plurality of linked mark words for the stack areas used in a current procedure and apparatus for updating the display registers for new stack areas for a new procedure including means for utilizing the reference values in a series of linked mark words stored in the memory for forming a series of absolute addresses to which the display registers are to be set, and means for storing the formed addresses in the order they are formed into the display registers in a predetermined order thereby updating the display registers for the new procedure.

11. In data processing apparatus as defined in claim 10 including register means for storing the address of the base of the stack containing the stack areas for the new procedure, said address forming means comprising means for combining the reference value in each mark word in such series with the stored base address and thereby form the absolute addresses to which the display registers are to be set.

12. In data processing apparatus as defined in claim 11 including means for storing a level value indicative of the level of the new procedure and also indicative of one of said display registers, means for storing an absolute address of a first mark word in the series of absolute addresses, means for storing into the display register indicated by said level value, the stored absolute address of the first mark word in the series of absolute addresses.

13. In a data processing apparatus as defined in claim 10 wherein a mark word not containing said reference value is stored in a stack area currently in use, a program word is stored in another stack area for a new procedure, a reference word is stored in such stack area currently in use having a value referencing a mark word for the stack area containing the program word, and including means for combining the value in the reference word with the mark word for the storage area currently in use and thereby provide a link in such mark word to the stack area containing such program word.

14. In a data processing system operative for processing information including parameters and indirect reference words in a memory in stacks of words stored in sequential memory locations, each stack being divided up into procedural blocks and including a mark word stored at the beginning of each procedural block, each mark word having a displacement address identifying the mark word of another procedural block in the stack relative to the base of the stack, a plurality of display registers each storing the absolute address of a different mark word, the addresses in such display registers being for procedural blocks currently being processed and being for use by the system in addressing relative thereto, the stacks containing at least one program control word referencing another procedure, such program control word having a level value identifying a level of such procedure and identifying a particular display register, the absolute address of the base of the stack, the absolute address of the mark word for the procedural block currently in use, the address of a program control word, and the address of another mark word all being stored in the data processing system, the method of updating the display registers as another procedure is entered including the steps of:

(a) reading out the program control word from said address of a program control word;

(b) storing said stored address of the mark word for the procedural block currently in use into the display register corresponding to the level value in the read program control word;

(c) incrementally changing the level value to identify another display register;

(d) storing said address of said another mark word into the display register identified by the changed level value;

(e) obtaining said another mark word from said address of another mark word;

(f) combining the displacement address of said another mark word obtained in step (e) with the stored base of stack address to form the address of a further mark word; and (g) repeating the steps (c) through (g) using the changed level value in repeating step (e) using said address of a further mark word formed in step (f) as the address in repeating steps (d) and (e) thereby updating other display registers until the changed level value is at a predetermined reference value.

15. A method according to claim 14 wherein the method is performed in response to the execution of a program operator specifying that another procedure is to be entered.

16. In a data processing system operative for processing information including parameters and indirect reference words in a memory in stacks of words stored in sequential memory locations, each stack being divided up into procedural blocks and including a mark word stored at the beginning of each procedural block, each mark word having a displacement address identifying mark word of another procedural block in the stack relative to the base of the stack, a plurality of display registers each storing the absolute address of a different mark word, the addresses in such display registers being for procedural blocks currently being processed and being for use by the system in addressing relative thereto, the stacks containing at least one program control word referencing another procedure, such program control word having a level value identifying a level of such procedure and identifying a particular display register, the absolute base address of the stack and the absolute address of the mark word for a procedural block currently in use all being stored in the data processing system, the method of updating the display registers as another procedure is entered including the steps of:

(a) storing an indirect reference word having a displacement address and an incremental address;

(b) combining the displacement address of said stored indirect reference word with said stored base of stack address to form the address of a first mark word;

(c) combining the incremental address from said indirect reference word with the address formed in step (b) to form the address in the stack of a program control word referencing another procedure;

(d) reading out the program control word from the address formed in step (c);

(e) storing said stored address of the mark word for the procedural block currently in use into the display register corresponding to the level value in the read program control word;

(f) incrementally changing the level value to identify another display register;

(g) storing said address of said first mark word into the display register identified by the changed level value;

(h) obtaining the first mark word from said address of said first mark word;

(i) combining the displacement address of said first mark word with the stored base of stack address to form the address of another mark word; and (j) repeating steps (f) through (j) using the changed level value in repeating step (h) using said address of said another mark word formed in step (i) as the address in repeating steps (g) and (h) thereby updating other display registers until the changed level value is at a predeteermined reference value.

17. In a data processing system operative for processing information including parameters and indirect reference words in a memory in stacks of words stored in sequential memory locations, each stack being divided up into procedural blocks and including a mark word stored at the beginning of each procedural block, each mark word having a displacement address identifying the mark word of another procedural block in the stack relative to the base of the stack, a plurality of display registers each storing the absolute address of a different mark word, the addresses in such display registers being for procedural blocks currently being processed and being for use by the system in addressing relative thereto, the stacks containing at least one program control word referencing another procedure, such program control word having a level value identifying a level of such procedure and identifying a particular display register, the absolute base address of the stack and the absolute address of the mark word for the procedural block currently in use all being stored in the data processing system, the method of updating the display registers as another procedure is entered including the steps of:

(a) storing an indirect reference word having an incremental address and a level value identifying a particular display register;

(b) reading out the absolute address from the display register identified by said level value;

(c) combining the incremental address from said indirect reference word with the address obtained in step (b) to form the address in the stack of a program control word referencing another procedure;

(d) reading out the program control word from the address formed in step (c);

(e) storing said stored address of the mark word for the procedural block currently in use into the display register corresponding to the level value in the read program control word;

(f) incrementally changing the level value to identify another display register in sequence;

(g) storing the address obtained in step (b) into the display register identified by the changed level value;

(h) obtaining the mark word from the address obtained in step (b);

(i) combining the displacement address of said mark word obtained in step (h) with the stored base of stack address to form the address of another mark word; and (j) repeating steps (f) through (j) using the changed level value in repeating step (f) using said address of said another mark word formed in step (i) as the address in repeating steps (g) and (h) thereby updating other display registers until the changed level value is at a predetermined reference value.

18. A method according to claim 17 wherein the method is performed in response to the execution of a program operator specifiying that another procedure is to be entered.

19. In a data processing system operative for processing information including parameters and indirect reference words in a memory in stacks of words stored in sequential memory locations, each stack being divided up into procedural blocks and including a mark word stored at the beginning of each procedural block, each mark word having a displacement address identifying the mark word of another procedural block in the stack relative to the base of the stack, a plurality of display registers each storing the absolute address of a different mark word, the addresses in such display registers being for procedural blocks currently being processed and being for use by the system in addressing relative thereto, the absolute address of the base of the stack being stored in the data processing system, the method of updating the display registers as a new procedure is entered including the steps of:

(a) forming an address of one of said mark words;

(b) forming a signal identifying one of said display registers;

(c) storing the address formed in step (a) into the identified display register;

(d) obtaining a mark word from the address formed in step (a);

(e) combining the displacement address of the mark word obtained in step (d) with the stored base of stack address to form the address of a further mark word;

(f) incrementally changing said signal identifying one of said display registers to identify another display register; and (g) repeating steps (c) through (g) using such another display register in repeating step (c) using said address of a further mark word formed in step (e) as the address in repeating steps (d) and (e) thereby updating other display registers until the changed signal is at a predetermined reference value.

References Cited

UNITED STATES PATENTS

| | | | |
|---|---|---|---|
| 3,299,410 | 1/1967 | Evans | 340—172.5 |
| 3,345,612 | 10/1967 | Goldman | 340—172.5 |
| 3,351,913 | 11/1967 | Pine | 340—172.5 |
| 3,370,274 | 2/1968 | Kettley et al. | 340—172.5 |
| 3,437,998 | 4/1969 | Bennett et al. | 340—172.5 |

PAUL J. HENON, Primary Examiner

P. R. WOODS, Assistant Examiner

PO-1050
(5/69)

UNITED STATES PATENT OFFICE
CERTIFICATE OF CORRECTION

Patent No. 3,548,384 Dated December 15, 1970

Inventor(s) Robert S. Barton, Bobby A. Creech, Benjamin A. Dent, Erwin A. Hauck and William M. McKeeman It is certified that error appears in the above-identified patent and that said Letters Patent are hereby corrected as shown below:

Col. 1, line 15, "data" should be after "program";

Col. 5, line 56, "operator" should be --operation--
line 58, "operation" should be --operator--
line 59, after "the", first occurrence, --content of the-- was omitted;

Col. 10, line 12, "coupled" should read --couples--;

Col. 13, line 25, "brief" should be after "aforegoing";

Col. 15, line 66, before "fields" --ℓℓ-- was omitted;

Col. 20, line 48, before "being" --stack-- was omitted;

Col. 23, line 68, before "mark" --the-- was omitted.

Signed and sealed this 17th day of August 1971.

(SEAL)
Attest:

EDWARD M.FLETCHER,JR.
Attesting Officer

WILLIAM E. SCHUYLER, JR.
Commissioner of Patents